(12) United States Patent
Archer et al.

(10) Patent No.: US 9,957,166 B2
(45) Date of Patent: May 1, 2018

(54) MOLECULAR SIEVES AND RELATED METHODS AND STRUCTURE DIRECTING AGENTS

(71) Applicant: CALIFORNIA INSTITUTE OF TECHNOLOGY, Pasadena, CA (US)

(72) Inventors: Raymond Archer, Pasadena, CA (US); Mark E. Davis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 62 days.

(21) Appl. No.: 15/044,041

(22) Filed: Feb. 15, 2016

(65) Prior Publication Data

US 2016/0272503 A1   Sep. 22, 2016

Related U.S. Application Data

(63) Continuation of application No. 14/034,386, filed on Sep. 23, 2013, now Pat. No. 9,289,757, which is a
(Continued)

(51) Int. Cl.
*C01B 39/04* (2006.01)
*B01J 29/70* (2006.01)
(Continued)

(52) U.S. Cl.
CPC ............. *C01B 39/48* (2013.01); *B01J 20/18* (2013.01); *B01J 20/3057* (2013.01);
(Continued)

(58) Field of Classification Search
CPC ......... C01B 39/04; C01B 39/08; C01B 39/12; C01B 39/48; B01J 20/18; B01J 20/3057;
(Continued)

(56) References Cited

U.S. PATENT DOCUMENTS 4,483,835 A   11/1984  Zones
4,556,477 A   12/1985  Dwyer
(Continued)

FOREIGN PATENT DOCUMENTS

CN   1181054         5/1998
CN   1736867 A       2/2006
(Continued)

OTHER PUBLICATIONS

Partial European Search Report dated Nov. 12, 2015 for European Patent Application No. EP20100762531, filed in the names of Raymond Archer et al. on Sep. 21, 2011. 6 pgs.
(Continued)

*Primary Examiner* — David M Brunsman
(74) *Attorney, Agent, or Firm* — Baker & Hostetler LLP

(57) ABSTRACT

Method for preparing molecular sieves and molecular sieves obtained thereby are described. The method includes preparing a reaction mixture, comprising a structure directing agent, at least one source of at least one oxide of a tetravalent element, optionally, one or more sources of one or more oxides selected from the group consisting of oxides of trivalent elements, pentavalent elements, and mixtures thereof, optionally, at least one source of an element selected from Groups 1 and 2 of the Periodic Table; and optionally, hydroxide ions or fluoride ions, and maintaining the reaction mixture under conditions sufficient to form crystals of the molecular sieve. In the method, various imidazolium cations are used as the structure directing element.

23 Claims, 13 Drawing Sheets

Related U.S. Application Data continuation of application No. 12/757,894, filed on Apr. 9, 2010, now Pat. No. 8,562,942.

(60) Provisional application No. 61/167,968, filed on Apr. 9, 2009.

(51) Int. Cl.

| | |
|---|---|
| *C01B 39/48* | (2006.01) |
| *B01J 29/87* | (2006.01) |
| *B01J 29/86* | (2006.01) |
| *B01J 29/04* | (2006.01) |
| *B01J 29/89* | (2006.01) |
| *B01J 29/88* | (2006.01) |
| *C01B 37/00* | (2006.01) |
| *C01B 37/02* | (2006.01) |
| *C01B 39/08* | (2006.01) |
| *C01B 39/12* | (2006.01) |
| *B01J 20/18* | (2006.01) |
| *B01J 20/30* | (2006.01) |
| *B01J 37/00* | (2006.01) |

(52) U.S. Cl.
CPC ............. *B01J 29/047* (2013.01); *B01J 29/70* (2013.01); *B01J 29/7007* (2013.01); *B01J 29/86* (2013.01); *B01J 29/87* (2013.01); *B01J 29/88* (2013.01); *B01J 29/89* (2013.01); *B01J 37/0018* (2013.01); *C01B 37/005* (2013.01); *C01B 37/007* (2013.01); *C01B 37/02* (2013.01); *C01B 39/04* (2013.01); *C01B 39/08* (2013.01); *C01B 39/12* (2013.01)

(58) Field of Classification Search
CPC . B01J 29/047; B01J 29/70; B01J 29/86; B01J 29/87; B01J 29/88; B01J 29/89
See application file for complete search history.

(56) References Cited

U.S. PATENT DOCUMENTS

| | | | |
|---|---|---|---|
| 5,053,373 | A | 10/1991 | Zones |
| 5,149,421 | A | 9/1992 | Miller |
| 5,252,527 | A | 10/1993 | Zones |
| 6,942,847 | B2 | 9/2005 | Harbuzaru et al. |
| 7,108,843 | B2 | 9/2006 | Zones et al. |
| 7,390,763 | B2 | 6/2008 | Zones et al. |
| 8,124,038 | B2 | 2/2012 | Lorgouilloux et al. |
| 8,373,276 | B2 | 2/2013 | Caullet et al. |
| 8,444,952 | B2 | 5/2013 | Dodin et al. |
| 8,562,942 | B2 * | 10/2013 | Archer ................ C01B 37/007 423/706 |
| 9,126,190 | B2 * | 9/2015 | Zones ..................... B01J 29/70 |
| 9,289,757 | B2 * | 3/2016 | Archer ................ C01B 37/007 |
| 2006/0138025 | A1 | 6/2006 | Zones et al. |
| 2006/0140855 | A1 | 6/2006 | Zones et al. |
| 2012/0041210 | A1 | 2/2012 | Dodin et al. |

FOREIGN PATENT DOCUMENTS

| | | |
|---|---|---|
| CN | 101115679 | 1/2008 |
| CN | 101269818 A | 9/2008 |
| FR | 2918979 A1 | 1/2009 |
| JP | S 60122717 | 7/1985 |
| JP | 1999-502804 | 9/1996 |
| JP | 2008-525300 A | 7/2008 |
| JP | 2012-512800 | 11/2009 |
| JP | 2010-534185 | 4/2010 |
| WO | WO 96/29284 | 9/1996 |
| WO | WO 2006/071354 | 7/2006 |
| WO | WO 2009/024665 | 2/2009 |
| WO | WO 2010/076399 | 7/2010 |

OTHER PUBLICATIONS

Aiello et al., "Synthesis and characterization of aluminosilicate MCM-22 in basic media in the presence of fluoride salts", Microporous and Mesoporous Materials, 2000, 35-36: 585-595.
Archer et al., "Imidazolium structure directing agents in zeolite synthesis: Exploring guest/host relationships in the synthesis of SSZ-70", Microporous and Mesoporous Materials 2010, 130: 255-265.
Archer et al., "Physicochemical properties and catalytic behavior of the molecular sieve SSZ-70", Chemistry of Materials, 2010, 22: 2563-2572.
Burrell et al., "The large scale synthesis of pure imidazolium and pyrrolidinium ionic liquids", Green Chemistry, 2007, 9: 449-545.
Camblor et al., "A new microporous polymorph of silica isomorphous to zeolite MCM-22", Chemistry of Material, 1996, 8: 2415-2417.
Camblor et al., "Synthesis and structural characterization of MWW type zeolite ITQ-1, the pure silica analog of MCM-22 and SSZ-25", Journal of Physical Chemistry B., 1998, 102: 44-51.
Corma et al., "Discovery of a new catalytically active and selective zeolite (ITQ-30) by high-throughput synthesis techniques", Journal of Catalysis, 2006, 241: 312-318.
Chan et al., "High-resolution electron microscopy characterization of SSZ-25 zeolite", Microporous Materials, 1995, 3: 409-418.
Chen et al., "Characterization of zeolites via vapor phase physisorption of hydrocarbons", Microporous and Mesoporous Materials, 2007, 104: 39-45.
Herrmann et al., "Synthesis, structure and catalytic applicaztion of palladium(II) complexes bearing Nheterocyclic carbenes and phosphines", Journal of Orqanometallic Chemistry, 2001, 617-618: 616-628.
Juttu et al., "Characterization and catalytic properties of MCM-56 and MCM-22 zeolites", Microporous and Mesoporous Materials, 2000, 40: 9-23.
Koller et al., "Five-coordinate silicon in high-silica zeolites", Journal of the American Chemical Society, 1999, 121: 3368-3376.
Koller et al., "SiO-..HOSi hydrogen bonds in as-synthesized high-silica zeolites", Journal of Physical Chemistry, 1995,99: 12588-12596.
Leonowicz et al., "MCM-22: A molecular sieve with two independent multidimensional channel systems", Science, 1994, 264: 1910-1913.
Matias et al., "n-Heptane transformation over a HMCM-22 zeolite: Catalytic role of the pore systems", Applied Catalysis A, 2008, 351: 174-183.
Zones et al., "Indirect assessment of unknown zeolite structures through inference from zeolite synthesis comparisons coupled with adsorption and catalytic selectivity studies", Journal of Catalysis, 2007, 250: 41-54.
Zones et al., "Studies of the synthesis of SSZ-25 zeolite in a "mixed-template" system", European Journal of Organic Chemistry, 2001, 7: 1990-2001.
Australian Office Action dated Oct. 8, 2013 for AU 2010233109 filed Sep. 11, 2011 in the name of California Institute of Technology.
Chinese Office Action dated Jan. 16, 2015 for Chinese Patent Application No. 201080015619 filed Oct. 9, 2011 in the name of California Institute of Technology (English Translation + Chinese Original) (8 pages).
Chinese Office Action dated May 4, 2014 for Chinese Patent Application No. 201080015619 filed Oct. 9, 2011 in the name of California Institute of Technology (English Translation+ Chinese Original) (14 pages).
Chinese Office Action dated Oct. 14, 2015 for Chinese Patent Application No. 201080015619 filed Oct. 9, 2011 in the name of California Institute of Technology (English Translation + Chinese Original) (11 pages).
Chinese Office Action dated Jun. 8, 2013 for CN 201080015619.X filed Oct. 9, 2011 in the name of California Institute of Technology—Chinese to English translation.
Davis, M.E. "Zeolites from a Materials Chemistry Perspective." Chemistry of Materials, vol. 26, pp. 239-245. Sep. 6, 2013.

(56) References Cited

OTHER PUBLICATIONS

Davis, M.E. And Lobo, R.F. "Zeolite and Molecular Sieve Synthesis." Chem. Mater., vol. 4, pp. 756-768. 1992.
Davis, M.E. et al. "A Perspective on Zeolite Synthesis: How Do You Know What You'll Get?" Synthesis of Porous Materials: Zeolites, Clays and Nanostructures. Occelli, M.L. and Kessler, H. New York: Marcel Dekker, Inc. pp. 1-35. 1996.
English translation of Japanese Office Action dated Jul. 30, 2015 for Japanese Patent Application No. 2012-504903 filed Oct. 7, 2011 in the name of California Institute of Technology (2 pages).
International Application No. PCT/US2010/030615: International Search Report dated Nov. 16, 2010, 3 pages.
International Application No. PCT/US2010/030615: Written Opinion dated Nov. 16, 2010, 4 pages.
International Preliminary Report on Patentability dated Oct. 11, 2011 for PCT/US2010/030615 filed Apr. 9, 2010 in the name of California Institute of Technology.
Japanese Office Action dated Aug. 5, 2014 for Japanese Patent Application No. 2012-504903 filed Oct. 7, 2011 in the name of California Institute of Technology (English Translation +Japanese Original) (6 pages).
Japanese Office Action dated Mar. 6, 2015 for Japanese Patent Application No. 2012-504903 filed Oct. 7, 2011 in the name of California Institute of Technology (1 page).
Japanese Office Action dated Jan. 7, 2014 for JP 2012-504903 filed Oct. 7, 2011 in the name of California Institute of Technology—Japanese to English translation.
Notice of Acceptance dated Oct. 20, 2014 for Australian Patent Application No. 2010233109 filed Sep. 19, 2011 in the name of California Institute of Technology (2 pages).
Notice of Allowance dated Jun. 18, 2013 for U.S. Appl. No. 12/757,894, filed Apr. 9, 2010 in the name of California Institute of Technology.
Robson, J. Verified Syntheses of Zeolithic Materials. Second Revised Edition. Amsterdam, The Netherlands: Elsevier Science B.V. 2001 (23 pages).
Zones, S.I. "Inorganic factors in the synthesis of large-pore borosilicates from tricycle [5.2.1.0"0] decane orqano-cations."Microporous Materials, vol. 2, DD. 281-287. 1994.

* cited by examiner

MOLECULAR SIEVES AND RELATED METHODS AND STRUCTURE DIRECTING AGENTS

CROSS REFERENCE TO RELATED APPLICATIONS

This application is a continuation of U.S. patent application Ser. No. 14/034,386 filed on Sep. 23, 2013, now U.S. Pat. No. 9,289,757 and incorporated herein by reference in its entirety, which in turn is a continuation of U.S. patent application Ser. No. 12/757,894 filed on Apr. 9, 2010 and issued as U.S. Pat. No. 8,562,942 on Oct. 22, 2013 and is incorporated herein by reference in its entirety, which in turn claims the benefit of priority under 35 USC § 119 of U.S. Provisional Application Ser. No. 61/167,968 filed Apr. 9, 2009, the entire disclosure of which is incorporated herein by reference.

FIELD

The present disclosure relates to molecular sieves and related methods and structure directing agents.

BACKGROUND

Molecular sieves are a class of important materials used in the chemical industry for processes such as gas stream purification and hydrocarbon conversion processes. Molecular sieves are porous solids having interconnected pores of same or different sizes. Molecular sieves typically have a one-, two- or three-dimensional crystalline pore structure having pores of one or more molecular dimensions that selectively adsorb molecules that can enter the pores, and exclude those molecules that are too large. The pore size, pore shape, interstitial spacing or channels, composition, crystal morphology and structure are a few characteristics of molecular sieves that determine their use in various hydrocarbon adsorption and conversion processes.

SUMMARY

Molecular sieves and related methods and structure directing agents are herein described. In particular, in some embodiments molecular sieves are described that are obtainable by a method for preparing various molecular sieves in a hydroxide media, that uses structure directing agents, such as various imidazolium cations.

According to embodiments of the present disclosure, methods for preparing molecular sieves are provided and molecular sieves obtainable thereby. The method comprises preparing a reaction mixture, comprising, at least one source of at least one oxide of a tetravalent element; and a structure directing agent comprising imidazolium cation (I)

wherein R is a substitutent that can be a straight-chained or branched alkyl other than isopropyl, a cycloolefin, a bicyclic alkyl and a tricyclic alkyl, or an aryl. The reaction mixture can optionally comprise, one or more sources of one or more oxides selected from the group consisting of oxides of trivalent elements, pentavalent elements, and mixtures thereof; optionally, at least one source of an element selected from Groups 1 and 2 of the Periodic Table; and optionally, hydroxide ions or fluoride ions; followed by maintaining the reaction mixture under conditions sufficient to form crystals of the molecular sieve, to thereby obtain the as-synthesized molecular sieve.

According to embodiments of the present disclosure, a variety of structure directing agents useful in the process of preparation of molecular sieves are provided; specifically a structure directing agent comprising imidazolium cation (I)

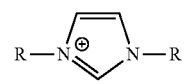

wherein R is a substitutent that can be a straight-chained or branched alkyl other than isopropyl, a cycloolefin, a bicyclic alkyl and a tricyclic alkyl, or an aryl.

DETAILED DESCRIPTION

Figure 1:
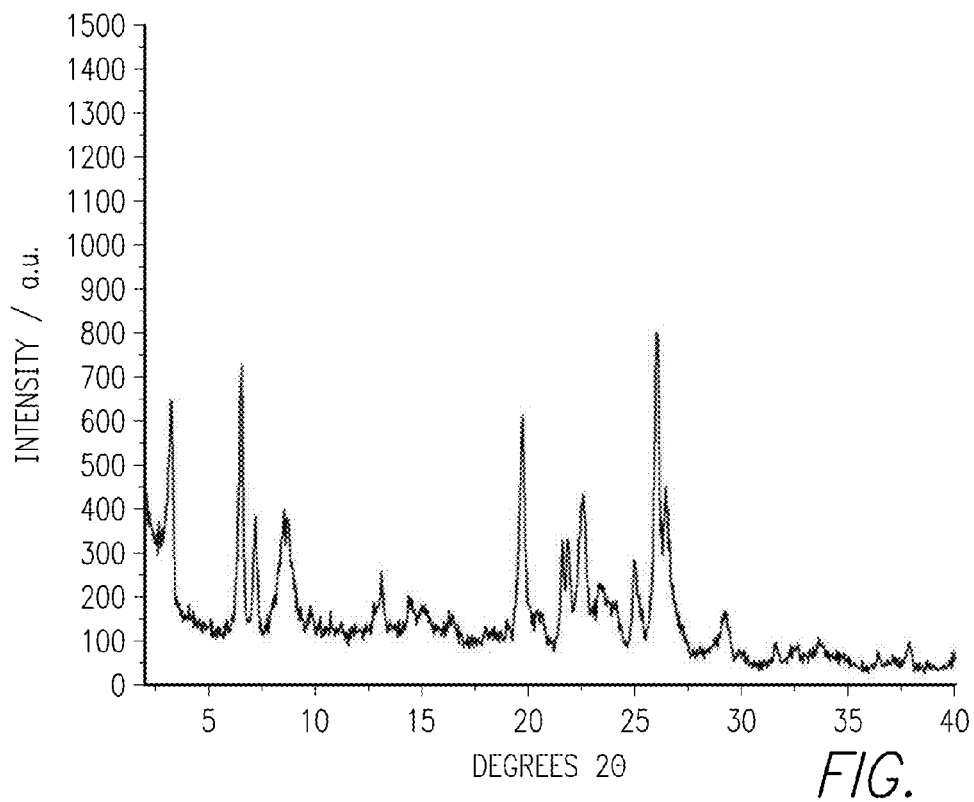
FIG. 1 illustrates an XRD pattern for one as-synthesized product according to an embodiment of the present disclosure.

Molecular sieves and related methods and structure directing agents are herein described.

The term "molecular sieve" indicates a porous solid having interconnected pores of same or different sizes, and includes (a) intermediate and (b) final or target molecular sieves and molecular sieves produced by (1) direct synthesis or (2) post-crystallization treatment (secondary synthesis). Secondary synthesis techniques allow for the synthesis of a target material having a higher Si:Al ratio from an intermediate material by acid leaching or other similar dealumination methods.

Molecular sieves particularly useful in industries such as petroleum and petrochemical industries are the zeolites. A zeolite is an aluminosilicate having an open framework structure sharing the oxygen atoms of [SiO$_4$] and [AlO$_4$] tetrahedra or octahedra. Mobile extra framework cations reside in the pores for balancing charges along the zeolite framework. These charges are a result of substitution of a tetrahedral framework cation (e.g. Si$^{4+}$) with a trivalent or pentavalent cation. Extra framework cations counter-balance these charges preserving the electroneutrality of the framework, and these cations are exchangeable with other cations and/or protons.

Synthetic molecular sieves, particularly zeolites, are typically synthesized by mixing sources of alumina and silica in an aqueous media, often in the presence of a structure directing agent or templating agent. The structure of the molecular sieve formed is determined in part by solubility of the various sources, silica-to-alumina ratio, nature of the cation, synthesis conditions (temperature, pressure, mixing agitation), order of addition, type of templating agent, and the like.

An exemplary molecular sieve, designated as SSZ-70, and related methods for making in presence of a structure directing agent (also commonly referred to as a templating agent) are described in U.S. Pat. No. 7,108,843, issued Sep. 19, 2006 to Zones and Burton, incorporated herein by reference in its entirety.

The present disclosure is directed to a method of making molecular sieves using a variety of structure directing agents (SDA). According to embodiments of the present disclosure, structure directing agents that are used include imidazolium cation.

In general, molecular sieves of the present disclosure are prepared by using the following procedure. First, a reaction mixture is prepared, by combining the following components:

a structure directing agent.
at least one source of at least one oxide of a tetravalent element;
optionally, at least one source of an element selected from Groups 1 and 2 of the Periodic Table;
optionally, hydroxide ions, or alternatively, fluoride ions;
optionally, one or more sources of one or more oxides trivalent elements, pentavalent elements, and mixtures thereof; and
water.

For each embodiment described herein, the molecular sieve reaction mixture can be supplied by more than one source of a given reagent. For example in some embodiments, silica can be supplied to the reaction by both a fumed silica source and from another zeolite added to provide an Al source. The zeolite provided will also provide some silica. Also, in one embodiment, two or more reaction components can be provided by one source, such as, for example, where a zeolite is used to provide the Al source for making Al SSZ-70. Crystal size, morphology and crystallization time of the molecular sieve described herein may vary with the nature of the reaction mixture and the crystallization conditions.

A reaction mixture thus prepared is then maintained under conditions sufficient to form crystals of the molecular sieve. These conditions will be described in more detail below.

As mentioned above, the SDAs that are employed in the embodiments of the disclosure comprise imidazolium cation, which has the following general structure (I):

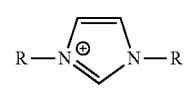

I

In the general structure I, R is a substitutent that can be a straight-chained or branched alkyl with exclusion of isopropyl (e.g., methyl, ethyl, iso-butyl, tert-butyl, a branched amyl, or a branched octyl), a cycloolefin (e.g., cyclopentyl, cyclohexyl, cycloheptyl, or cyclooctyl), a bicyclic alkyl and a tricyclic alkyl (such as adamantyl, etc.), or an aryl (e.g., an unsubstituted or a substituted phenyl).

The term "alkyl" as used herein refers to a linear, branched, or cyclic saturated hydrocarbon group typically although not necessarily containing 1 to about 10 carbon atoms, for example 1 to about 6 carbon atoms, such as methyl, ethyl, n-propyl, n-butyl, isobutyl, t-butyl, octyl, decyl, and the like, as well as cycloalkyl groups having for example 3 to 8 carbon atoms, such as cyclopentyl, cyclohexyl and the like. Generally, although again not necessarily, alkyl groups herein contain 1 to about 6 carbon atoms. The term "cycloalkyl" refers to a cyclic alkyl group, typically having 4 to 8 carbon atoms.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Typically, aryl groups contain 5 to 24 carbon atoms, for example, 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like.

Various choices of substituents R in the general structure I, above, can lead to various SDAs. Typically, the substituents R are selected in a way so as to have the SDA that is able to have some solubility in the rest of the aqueous synthesis mix.

The term "olefins" as used herein indicates two carbons covalently bound to one another that contain a double bond ($sp^2$-hybridized bond) between them.

Some specific, non-limiting examples of imidazolium cation of the general structure (I) that can be used include the following cations (1)-(15):

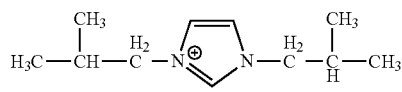
1

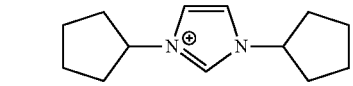
2

3

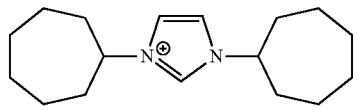
4

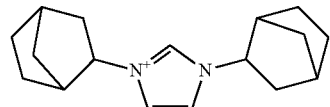
5

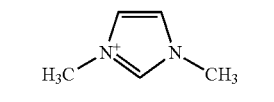
6

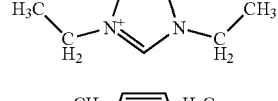
7

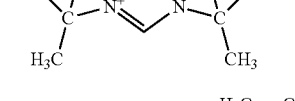
8

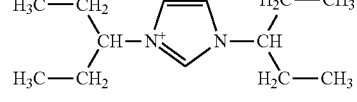
9

-continued

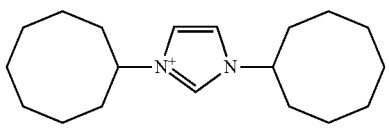
10

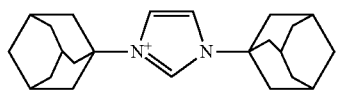
11

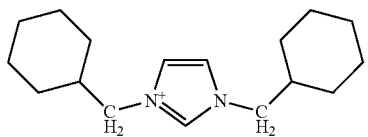
12

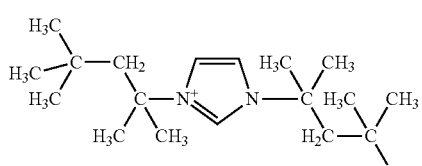
13

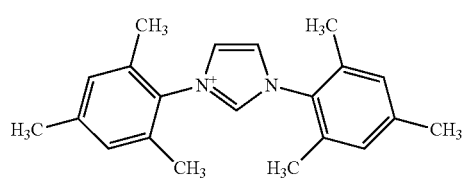
14

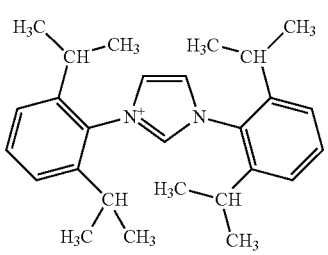
15

Imidazolium cation is typically associated with a corresponding anion. Non-limiting examples of suitable anions include hydroxide, halide (i.e., fluoride, chloride, bromide or iodide), acetate, sulfate, tetrafluoroborate and carboxylate. The systems that include imidazolium cation associated with a corresponding anion can be prepared according to known methods of synthetic organic chemistry. These synthetic procedures, and the properties of the compounds so obtained, are illustrated in the "Examples" portion of the application below.

As mentioned above, the reaction mixture includes at least one source of at least one oxide of a tetravalent element. The tetravalent element (sometimes hereinafter referred to as "T") can be an element from Groups 4-14 of the Periodic Table.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

According to embodiments of the disclosure, T can be any of silicon, germanium or titanium. In one embodiment, T is silicon. Sources of elements selected for composition variable T include oxides, hydroxides, acetates, oxalates, ammonium salts and sulfates of the element(s) selected for T.

In one embodiment, each source of the element(s) selected for composition variable T is an oxide. Where T is silicon, sources useful herein for silicon include fumed silica, precipitated silicates, silica hydrogel, silicic acid, colloidal silica, tetra-alkyl orthosilicates (e.g. tetraethyl orthosilicate), and silica hydroxides. Examples of silica sources useful for making high-silica forms of the molecular sieves of the disclosure include fumed silica (e.g. CAB-O-SIL M-5, Cabot Corporation), hydrated silica (e.g. HI-SIL 233, PPG Industries), silica tetra alkoxides and mixtures thereof. Also useful are colloidal silicas where the solid content is 30-40 wt. % $SiO_2$, and these materials can be stabilized by small amounts of sodium or ammonium cations. Further, colloidal sols where aluminum is dispersed in the silica sol can be used to provide an instant $SiO_2/Al_2O_3$ ratio which is desired. Sources useful herein for germanium include germanium oxide and germanium ethoxide.

As noted above, the reaction mixture further optionally includes at least one source of an element selected from Groups 1 and 2 of the Periodic Table (sometimes hereinafter referred to as "M") and hydroxide ions. Typically, an alkali metal hydroxide and/or an alkaline earth metal hydroxide can be used for this purpose, for example, sodium hydroxide, potassium hydroxide, lithium hydroxide, cesium hydroxide, rubidium hydroxide, calcium hydroxide or magnesium hydroxide; however, this component can be omitted so long as the equivalent basicity is maintained. Thus, it can be beneficial to ion exchange, for example, the halide to hydroxide ion, thereby reducing or eliminating the alkali metal hydroxide quantity required. The alkali metal cation or alkaline earth cation can be part of the as-synthesized crystalline oxide material, in order to balance valence electron charges therein.

As mentioned above, the reaction mixture further optionally includes at least one or more sources of one or more oxides trivalent elements, pentavalent elements (sometimes hereinafter referred to as "X"), and mixtures thereof. For each embodiment described herein, X is selected from the group consisting of elements from Groups 3-13 of the Periodic Table. More specifically, X can be any of gallium, aluminum, iron or boron. Sources of elements selected for optional composition variable X include oxides, hydroxides, acetates, oxalates, ammonium salts and sulfates of the element(s) selected for X. Typical sources of aluminum oxide include aluminates, alumina, and aluminum compounds such as $AlCl_3$, $Al_2(SO_4)_3$ aluminum hydroxide (Al(OH)$_3$), kaolin clays, and other zeolites. An example of the source of aluminum oxide is LZ-210 zeolite (a type of Y zeolite). Boron, gallium, and iron can be added in forms corresponding to their aluminum and silicon counterparts.

Where the molecular sieve formed is an intermediate material, the process of the present disclosure includes a further step of synthesizing a target molecular sieve by post-synthesis techniques, such as acid leaching. Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

By varying the starting SDAs and inorganic compounds, a variety of molecular sieves can be obtained using the method of the present disclosure. One example of such a resulting molecular sieve is SSZ-70. Additional molecular sieve phases that can be obtained include TON, MFI, MTT, MTW, BEA*, MOR, CFI, AFX and STF, each of which is defined in accordance with the rules approved by the Structure Commission of the International Zeolite Association. Complete information on the structure and properties of each of SSZ-70, TON, MFI, MTT, MTW, BEA*, MOR, CFI, AFX and STF can be found at www.iza-structure.org/databases, the entire content of which is incorporated herein by reference.

In some embodiments, molecular sieves can be prepared using methods herein described in fluoride media or in hydroxide media at temperatures between about 150° C. and about 170° C. Ratios between $SiO_2$ and $Al_2O_3$ as well as ratios between other components that can be used are shown below in Tables 3 and 4.

In other embodiments, molecular sieves can be prepared using methods herein described from pure-silica fluoride reactions at about 150° C. or at about 175° C., with the molar $H_2O/SiO_2$ ratios between about 3.5 and 14.5.

In other embodiments, molecular sieves can be prepared using methods herein described from borosilicate hydroxide reactions at about 150° C., with the molar $SiO_2/B_2O_3$ ratios between about 8 and 100, or higher.

In yet other embodiments, molecular sieves can be prepared using methods herein described from alumosilicate hydroxide reactions at about 150° C., with the molar $SiO_2/Al_2O_3$ ratios between about 35 and 100. In particular in some of those embodiments, cations (1)-(3) can be used:

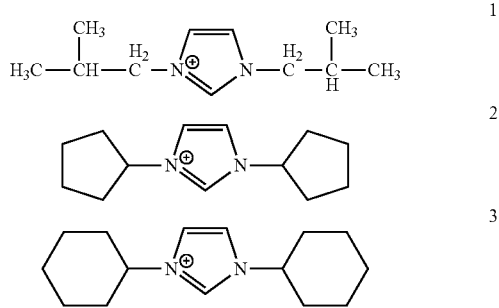

In some of the embodiments where cations 1 to 3 are used related processes allow production of a molecular sieve SSZ-70 product with good Al incorporation, and/or with high available void volume of the resulting products after the removal of the SDA.

The a general overview of the composition of the reaction mixture from which the molecular sieve is formed, in terms of molar ratios, is identified in Table 1 below:

TABLE 1

| Components | Molar Ratio, Typical | Molar Ratio, Exemplary |
|---|---|---|
| $TO_2/X_2O_a$*$^)$ | 2 to 1 and greater | 25-60 to 1 (X trivalent) 8-60 to 1 (X tetravalent) |
| $M/TO_2$ | 0 to 0.40 | 0.10 to 0.25 |
| $SDA/TO_2$ | 0.05 to 0.80 | 0.10 to 0.20 |
| $OH^-/TO_2$ | 0.10 to 0.80 | 0.20 to 0.30 |
| $H_2O/TO_2$ | 30 to 80 | 35 to 45 |
| $HF/TO_2$ | 0.2 to 0.8 | 0.3 to 0.6 |

*$^)$ a = 1 or 2 when X is tetravalent; a = 3 when X is trivalent; a = 5 when X is pentavalent.

In some embodiments, wherein the components include $TO_2/X_2O_a$ and X is trivalent (e.g. aluminum or boron) the molar ratio can be about 20 to 1 and greater, and in particular about 25-60 to 1.

In some embodiments, wherein the components include $TO_2/X_2O_a$ and X is tetravalent (e.g. germanium) the molar ratio can be 8 to 1 and greater, and in particular about 8-60 to 1.

In some embodiments, molecular sieves can be prepared using methods herein described from hydroxide synthesis, with the molar $SiO_2/B_2O_3$ ratios between about 20-200 to 1 or higher, or, alternatively, with the molar $SiO_2/Al_2O_3$ ratios between about 30-50 to 1, 30-45 to 1 or higher. In some of those embodiments the hydroxide synthesis can be performed at a temperature of about at about 170° C.

In some embodiments, molecular sieves can be prepared using methods herein described from fluoride mediated reactions with the molar ratios for $SiO_2/Al_2O_3$ from about 30-500 to 1, and for $SiO_2/GeO_2$ of about 2-50 and in particular about 2-20 to 1. In embodiments where molecular sieves are prepared from $SiO_2/GeO_2$ the reaction can be performed with or without fluoride.

After a reaction mixture has been prepared as described herein above, it is maintained under crystallization conditions sufficient to form the molecular sieve. Such conditions are generally known. (See, Harry Robson, *Verified Syntheses of Zeolitic Materials,* 2$^{nd}$ revised edition, Elsevier, Amsterdam (2001)).

For example, the reaction mixture can be maintained at an elevated temperature until the molecular sieve is formed over a period of a few days to several weeks. The hydrothermal crystallization is usually conducted under autogenous pressure, ranging from 50-200 PSI (0.34 MPa to 1.38 MPa), and usually in an autoclave so that the reaction mixture is subject to autogenous pressure, at a temperature between 125° C. and 200° C.

The reaction mixture can be subjected to mild stirring or agitation during the crystallization step. It will be understood by a person skilled in the art that the molecular sieves described herein can contain impurities, such as amorphous materials, unit cells having framework topologies which do not coincide with the molecular sieve, and/or other impurities (e.g., organic hydrocarbons). During the hydrothermal crystallization step, the molecular sieve crystals can be allowed to nucleate spontaneously from the reaction mixture.

The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for silicon used in the reaction mixture. Once the molecular sieve has formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the structure directing agent. The structure directing agent can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the structure directing agent from the molecular sieve. The structure directing agent can also be removed by photolysis techniques (e.g. exposing the structure directing agent-containing molecular sieve product to light or electromagnetic radiation that has a wavelength shorter than visible light under conditions sufficient to selectively remove the organic compound from the molecular sieve) as described in U.S. Pat. No. 6,960,327 to Navrotsky and Parikh, issued Nov. 1, 2005.

The molecular sieve can subsequently be calcined in steam, air or inert gas at temperatures ranging from about 200° C. to about 800° C. for periods of time ranging from 1 to 48 hours, or more. Usually, it is desirable to remove the extra-framework cation (e.g. H) by ion-exchange or other known method and replace it with hydrogen, ammonium, or any desired metal-ion.

Where the molecular sieve formed is an intermediate material, the target molecular sieve can be achieved using post-synthesis techniques to allow for the synthesis of a target material having a higher Si:Al ratio from an intermediate material by acid leaching or other similar dealumination methods.

Molecular sieves prepared by the process of the present disclosure have a composition, as-synthesized and in the anhydrous state, in which the mole ratios between components are shown in Table 2.

TABLE 2

| Components | Molar Ratio, Typical | Molar Ratio, Exemplary |
|---|---|---|
| $TO_2/X_2O_a$ | 2 or greater | |
| $M/TO_2$ | 0 to 0.03 | |
| $SDA/TO_2$ | 0.02 to 0.06 | 0.02 to 0.04 |
| $F-/TO_2$ | 0 to 0.08 | |

In some embodiments, wherein the components include $TO_2/X_2O_a$ and X is trivalent (e.g. aluminum and boron) the molar ratio can be 20 to 1 or greater.

In some embodiments, wherein the components include $TO_2/X_2O_a$ and X is tetravalent (e.g., germanium) the molar ratio can be 2 to 1 or greater In embodiments, where a molecular sieve is originated from $SiO_2/Al_2O_3$, the $SiO_2/Al_2O_3$ ratio in the product is typically about 80-90% of the value of the starting ratio. In embodiments where a molecular sieve is originated from $SiO_2/B_2O_3$, the $SiO_2/B_2O_3$ ratio in the product is typically about 125-200% of the value of the starting ratio.

Molecular sieves synthesized by the process of the present disclosure are characterized by their XRD pattern. The XRD pattern for one such product, SSZ-70, is described in U.S. Pat. No. 7,108,843, issued Sep. 19, 2006 to Zones and Burton. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al mole ratio from sample to sample. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was CuK-α radiation. The peak heights and the positions, as a function of 2θ, where θ is the Bragg angle, were read from the relative intensities of the peaks (adjusting for background), and d, the interplanar spacing in Angstroms corresponding to the recorded lines, can be calculated.

The molecular sieve catalyst of the present disclosure can optionally be combined with one or more catalyst supports, active base metals, other molecular sieves, promoters, and mixtures thereof. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

Catalyst supports combinable with molecular sieves of the disclosure include alumina, silica, zirconia, titanium oxide, magnesium oxide, thorium oxide, beryllium oxide, alumina-silica, amorphous alumina-silica, alumina-titanium oxide, alumina-magnesium oxide, silica-magnesium oxide, silica-zirconia, silica-thorium oxide, silica-beryllium oxide, silica-titanium oxide, titanium oxide-zirconia, silica-alumina-zirconia, silica-alumina-thorium oxide, silica-alumina-titanium oxide or silica-alumina-magnesium oxide, preferably alumina, silica-alumina, clays, and combinations thereof.

Exemplary active base metals useful herein include those selected from the elements from Group 6 and Groups 8 through 10 of the Periodic Table, their corresponding oxides and sulfides, and mixtures thereof. In one embodiment, each base metal is selected from the group consisting of nickel, palladium, platinum, cobalt, iron, chromium, molybdenum, tungsten and combinations thereof. In another embodiment, the hydroprocessing catalyst contains at least one Group 6 base metal and at least one base metal selected from Groups 8 through 10 of the periodic table. Exemplary metal combinations include Ni/Mo/W, Mi/Mo, Mo/W, Co/Mo, Co/W and W/Ni. Promoters include those selected from phosphorous, boron, silicon, aluminum and combinations thereof.

Metals can also be introduced into the molecular sieve by replacing some of the cations in the molecular sieve with metal cations via standard ion exchange techniques known in the art. Typical replacing cations can include metal cations, e.g., rare earth, Group IA, Group IIA and Group VIII metals, as well as their mixtures. Examples of the replacing metallic cations include cations of metals such as rare earth, manganese, calcium, magnesium, zinc, cadmium, platinum, palladium, nickel, cobalt, titanium, aluminum, tin and iron.

The hydrogen, ammonium, and metal components can be ion-exchanged into the molecular sieves of the disclosure. The molecular sieves of the disclosure can also be impregnated with the metals, or the metals can be physically and intimately admixed with the molecular sieves of the disclosure using standard methods known to the art.

Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this approach results in a more effective ion exchange. Representative ion exchange techniques are known in the art.

Following contact with the salt solution of the desired replacing cation, the molecular sieve is typically washed with water and dried at temperatures ranging from 65° C. to about 200° C. After washing, the molecular sieve can be calcined in air or inert gas as described above, to produce a catalytically active product especially useful in hydrocarbon conversion processes. Regardless of the cations present in the as-synthesized form of the molecular sieves of the disclosure, the spatial arrangement of the atoms which form the basic crystal lattice of the molecular sieve remains essentially unchanged.

The molecular sieves made from the process of the present disclosure can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieves made from the process of the present disclosure can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

The molecular sieves made from the process of the present disclosure are useful in catalysts for a variety of hydrocarbon conversion reactions such as hydrocracking, dewaxing, isomerization and the like. The molecular sieves made from the process of the present disclosure can be also useful as adsorbents and as low-dielectric K materials. Exemplary uses of the molecular sieve having low dielectric K potential are described in U.S. Pat. No. 7,138,099 incorporated herein by reference in its entirety.

EXAMPLES

The molecular sieves, structure directing agents and related methods and system herein described are further illustrated in the following examples, which are provided by way of illustration and are not intended to be limiting.

In particular, the following examples illustrate exemplary synthesis and uses of molecular sieves using imidazolium structure directing agents. A person skilled in the art will appreciate the applicability of the features described in detail for SDA 1-12 and related molecular sieve for additional SDA having different substituents according to the present disclosure, and to related molecular sieves.

The following experimental procedures and characterization data were used for all compounds and their precursors exemplified herein.

General Synthetic Procedures for Structure Directing Agents

All reagents were purchased from commercial vendors and used as received. Compounds 6 and 7 were synthesized by quaternizing an imidazole with the appropriate alkyl halide. Compounds 14 (i.e., 1,3-bis(2,4,6-trimethylphenyl) imidazolium chloride and 15 (i.e., 1,3-bis(2,6-diisopropyl-phenyl)imidazolium chloride) were purchased from Sigma-Aldrich and used as received. All other SDAs were synthesized by adapting known and published procedures (W. A. Herrmann, V. P. W. Bohm, C. W. K. Gstottmayr, M. Grosche, C. P. Reisinger, T. Weskamp, J. *Organomet. Chem.* 617 (1) (2001) 616-628. W. A. Herrmann, C. Kocher, L. J. Goossen, Process for Preparing Heterocyclic Carbenes, U.S. Pat. No. 6,025,496, Feb. 15, 2000).

Crude tetrafluoroborate salts were purified by recrystallization. Similar recrystallization attempts for halide salts were largely unsuccessful; therefore, an aqueous activated carbon treatment was employed (A. K. Burrell, R. E. Del Sesto, S. N. Baker, T. M. McCleskey, G. A. Baker, *Green*

Chem. 9 (5) (2007) 449-454). Liquid NMR spectra were recorded on 300 MHz Varian Mercury spectrometers. Combustion analysis was performed at the Chevron Energy Technology Center (Richmond, Calif.) using a Carlo-Erba Combustion Elemental Analyzer.

All SDAs were exchanged to the hydroxide form using Dowex Monosphere 550A UPW hydroxide resin (Supelco). Final hydroxide concentration was determined by titration with a 0.01 N HCl solution to a phenolphthalein end point. Several reactions with 1,3-bis(cyclohexyl) imidazolium (compound 3) and 1,3-bis(1-adamantyl)imidazolium (compound 11) were performed with $SDA^+OH^-$ solutions obtained after ion-exchange from commercially available tetrafluoroborate salts (Sigma-Aldrich). Ion-exchange of 1,3-bis(1-adamantyl)imidazolium tetrafluoroborate took approximately 1 week at room temperature due to the low solubility of the parent salt (>90% ion-exchange by titration).

General Synthetic Procedures for Inorganic Reactions

All reactions were performed in 23 mL or 45 mL PTFE-lined stainless steel autoclaves (Parr Instruments). Hydroxide mediated reactions were tumbled at approximately 40 rpm using spits built into convection ovens. Fluoride mediated reactions were not tumbled. Silica sources were tetraethylorthosilicate (TEOS, Sigma-Aldrich, 98%) for fluoride reactions and Cab-O-Sil M5 fumed silica (Cabot) for hydroxide reactions. Boric acid (J. T. Baker, ACS Reagent) was used for borosilicate reactions and Reheis F-2000 (50-53 wt. % $Al_2O_3$) or NaY zeolite (Tosoh HSZ-320NAA, SiO2/Al2O3=5.5, Na/Al=1) were used in aluminosilicate reactions. Germanosilicate reactions used germanium dioxide (99.98%, Alfa-Aesar) and TEOS.

Gels for fluoride reactions were prepared by adding boric acid or aluminum hydroxide gel (if required) to the $SDA^+OH^-$ solution then adding TEOS. The vessel was covered and stirred overnight to ensure complete TEOS hydrolysis then left uncovered in a 40° C. oven to evaporate the required water and ethanol. Once the desired mass had been reached 48 wt. % hydrofluoric acid (Mallinckrodt) and the required amount of water were added with care and the gel stirred to form a stiff paste. The autoclave was sealed and placed in a 150° C. (or 175° C.) oven and opened every 7-10 days to assess reaction progress. After homogenizing, a small sample was dispersed in 10 mL water and inspected under an optical microscope. For certain reactions at $H_2O/SiO_2$=7.5 and 14.5 small crystals were often visible. If no clear sign of crystallinity could be seen by optical microscope a small sample was filtered periodically and the XRD pattern inspected (Scintag XDS-2000 or Siemens D-500, Cu Ka). All reactions were monitored to at least 60 days with the product labeled amorphous if no crystalline material was observed.

Gels for hydroxide reactions were prepared by adding water, 1 N sodium hydroxide solution (if required), boron or aluminum source then silica and homogenized by hand. Pure-silica hydroxide reactions using compound 3 at 150° C. with NaOH replaced with LiOH or KOH gave the same product as the NaOH reaction so no additional runs with LiOH or KOH were performed except for product 11 as described below. Borosilicate reactions were run at $SiO_2/B_2O_3$=8 with no alkali hydroxide (gel composition 1.0 $SiO_2$:0.125 $B_2O_3$:0.25 $SDA^+OH^-$:23 $H_2O$); and the remaining reactions added sodium hydroxide with slightly increased water content (gel composition 1.0 $SiO_2$:$xB_2O_3$: 0.20 $SDA^+OH^-$:0.10 NaOH:30.0 $H_2O$ where 0.00 6×6 0.02).

Aluminosilicate reactions with NaY at SAR=35 had gel composition 1.0 $SiO_2$:0.029 $Al_2O_3$:0.20 $SDA^+OH^-$:y NaOH:30.0 $H_2O$ where y=0.25 or 0.05 (except where NaOH content was varied in a separate series). The remaining reactions used unstructured Reheis F-2000 aluminum hydroxide gel as aluminum source with gel composition 1.0 $SiO_2$:z $Al_2O_3$:0.20 $SDA^+OH^-$:0.10 NaOH:30.0 $H_2O$ with z=0.02 or 0.01. Finally, several germanosilicate reactions were performed with gel composition 1.0 $SiO_2$:0.11 $GeO_2$: 0.5$SDA^+OH^-$:3.5 $H_2O$ at 170° C. (not tumbled) (A. Jackowski, S. I. Zones, S. J. Hwang, A. W. Burton, J. Am. Chem. Soc. 131 (3) (2009) 1092-1100).

Reactions at 150° C. were monitored every 4-6 days by measuring solution pH and looking for signs of phase separation (checked every 2 days for 170° C. reactions). The reactions were checked until a pH maximum was observed then filtered. If no pH maximum was observed the reaction was continued until a sustained pH decline was observed (indicating SDA degradation). Several reactions at $SiO_2/B_2O_3$=8 formed a stiff paste that was not amenable to pH measurement. These reactions were stopped after 45 days heating and filtered as for other reactions. All crude products were washed with water plus a small amount of acetone and methanol then dried at room temperature.

Characterization

Powder X-ray diffraction (XRD) patterns were collected using Scintag XDS-2000 and Siemens D-500 diffractometers (Cu Ka radiation). Scanning electron microscopy (SEM) was performed using a JEOL JSM-6700F instrument. Transmission electron microscopy (TEM) was performed using a JEOL 2010 instrument at an accelerating voltage of 200 kV.

Example 1. Synthesis of Structure Directing Agent 1,3-Diisobutylimidazolium Bromide (1)

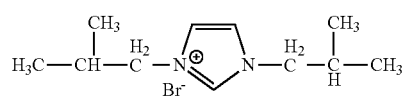

Isobutylamine (100 mmol) in 100 mL toluene was placed in a room temperature water bath then paraformaldehyde (100 mmol) was added with strong stirring. The solution was stirred at room temperature for 30 minutes then ice was added to the water bath. Hydrobromic acid solution (100 mmol, 48 wt % aqueous solution) was diluted to 20 wt % with water then placed on ice for approximately one hour. After cooling the toluene solution for one hour another 7.32 g (100 mmol) isobutylamine was added dropwise via addition funnel. The cold hydrobromic acid solution was added dropwise via addition funnel. The ice bath was removed and the solution warmed for approximately two hours then glyoxal solution (100 mmol, 40 wt % in water) was added dropwise. The reaction was stirred at room temperature for approximately 36 hours. The solution was concentrated by rotary evaporation to give a viscous yellow/orange oil.

Purification was achieved by adding 125 mL water and 20 mL saturated $KHCO_3$ and extracting with diethyl ether (2×100 mL). The aqueous phase was treated with 1.55 g activated carbon and stirred overnight at room temperature. The carbon was filtered off and washed with a small amount of water. This process was repeated three times until the filtrate was colorless to the eye. The filtrate was concentrated by rotary evaporation and the residue extracted with chloroform (2×100 mL) then filtered. The chloroform extracts were combined, dried over $MgSO_4$, filtered and stripped down by rotary evaporation to give a waxy residue. Further drying under high vacuum yielded 20.57 g off-white solids (78.7 mmol, 79% yield).

$^1$H NMR (300 MHz, DMSO-d$_6$): 9.41, 7.88, 4.06, 2.11, 0.85. $^{13}$C NMR (75 MHz, DMSO-d$_6$): 136.4, 122.8, 55.4, 28.7, 19.0. Analysis calculated for CH$_{11}$B$_{21}$BrN$_2$: C, 50.58; H, 8.10; N, 10.72 (C/N=4.72). Found: C, 50.27; H, 8.23; N, 10.61 (C/N=4.74).

Example 2. Synthesis of Structure Directing Agent 1,3-Bis(cyclopentyl)imidazolium Tetrafluoroborate (2)

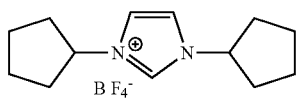

Cyclopentylamine (147 mmol) in 147 mL toluene was placed in a room temperature water bath then paraformaldehyde (147 mmol) was added with strong stirring. The solution was stirred at room temperature for 30 minutes then ice was added to the water bath. After cooling for one hour another 147 mmol cyclopentylamine was added dropwise via addition funnel. Tetrafluoroboric acid (147 mmol, 48 wt % in water) was diluted to 30 wt % then added dropwise via addition funnel. The ice bath was removed and the solution warmed for 30 minutes then glyoxal solution (147 mmol, 40 wt % in water) was added dropwise. The flask was heated at 40° C. overnight then allowed to cool to room temperature. The solution was transferred to a separation funnel and 150 mL diethyl ether and 75 mL saturated NaHCO$_3$ solution were added. The top ether/toluene layer was discarded and the aqueous layer plus oily residue were extracted with chloroform (3×100 mL).

Chloroform extracts were combined and washed with brine (100 mL), dried over MgSO$_4$, filtered and stripped down by rotary evaporation to obtain a dark, waxy residue. Further drying under high vacuum did not change the waxy residue. The residue was finely ground using a mortar and pestle then extracted with diethyl ether using a Soxhlet apparatus. The extracted solids were recrystallized from 4:1 tetrahydrofuran/ethyl acetate to give 16.09 g light tan solids. Further purification using activated carbon treatment as described for compound 1, above, yielded 15.33 g light yellow solids (52.5 mmol, 36% yield).

$^1$H NMR (300 MHz, DMSO-d$_6$): 9.36, 7.90, 4.74, 2.23-2.16, 1.91-1.78, 1.75-1.63. $^{13}$C NMR (75 MHz, DMSO-d$_6$): 134.6, 121.4, 60.6, 32.6, 23.2. Analysis calculated for C$_{13}$H$_{21}$BF$_4$N$_2$: C, 53.45; H, 7.25; N, 9.59 (C/N=5.57). Found: C, 55.54; H, 7.82; N, 10.00 (C/N=5.55).

Example 3. Synthesis of Structure Directing Agent 1,3-Bis(cyclohexyl)imidazolium Tetrafluoroborate (3)

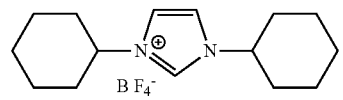

Using cyclohexylamine (2×200 mmol) the procedure used in Example 2 for synthesizing compound 2 was followed. After cooling, a solid precipitate was visible so the precipitate was filtered off and washed with 150 mL water then 150 mL diethyl ether and dried overnight under high vacuum. Recrystallization from 2:1 ethyl acetate/dichloromethane yielded 33.72 g off-white solids after drying under high vacuum overnight (105.3 mmol, 53% yield).).

1H NMR (300 MHz, DMSO-d6): 9.19, 7.88, 4.24, 2.07-2.03, 1.84-1.62, 1.43-1.30, 1.24-1.15. 13C NMR (75 MHz, DMSO-d6): 133.5, 120.8, 58.8, 32.4, 24.6, 24.4. Analysis calculated for C$_{15}$H$_{25}$BF$_4$N$_2$: C, 56.27; H, 7.87; N, 8.75 (C/N=6.43). Found: C, 56.56; H, 7.67; N, 8.68 (C/N=6.52).

Example 4. Synthesis of Structure Directing Agent 1,3-Bis(cycloheptyl)imidazolium Bromide (4)

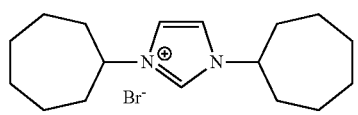

Using cycloheptylamine (2×110.4 mmol) the procedure used in Example 1 for synthesizing compound 1 was followed yielding 23.60 g white solids after drying under high vacuum (69.1 mmol, 63% yield). 1H NMR (300 MHz, DMSO-d6): 9.44, 7.93, 4.50, 2.08-1.97, 1.95-1.97, 1.77-1.69, 1.65-1.56, 1.54-1.46. 13C NMR (75 MHz, DMSO-d6): 133.5, 120.8, 61.1, 34.7, 26.8, 23.3. Analysis calculated for C$_{17}$H$_{29}$BrN$_2$: C, 59.82; H, 8.56; N, 8.21 (C/N=7.29). Found: C, 59.45; H, 8.33; N, 8.08 (C/N=7.36).

Example 5. Synthesis of Structure Directing Agent 1,3-Bis(bicyclo[2.2.1]heptan-2-yl) Imidazolium Bromide (5)

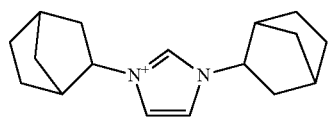

Using exo-2-aminonorbornane (2×19.1 mmol) the procedure used in Example 1 for synthesizing compound 1 was followed yielding 3.69 g off-white waxy solids (10.9 mmol, 57% yield). $^1$H NMR (300 MHz, DMSO-d$_6$): 9.39, 7.91, 4.38, 2.55, 2.39, 1.94-1.91, 1.62-1.50, 1.32-1.21. $^{13}$C NMR (75 MHz, DMSO-d$_6$): 134.1, 121.5, 62.4, 42.70, 42.68, 37.82, 37.79, 35.71, 35.11, 27.49, 26.31. Analysis calculated for C$_{17}$H$_{25}$BrN$_2$: C, 60.53; H, 7.47; N, 8.31 (C/N=7.28). Found: C, 60.23; H, 7.22; N, 8.20 (C/N=7.35).

Example 6. Synthesis of Structure Directing Agent 1,3-Dimethylimidazolium Iodide (6)

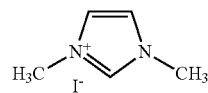

1-methylimidazole (4.11 g, 50 mmol, Sigma-Aldrich, 99%) in 50 mL ethyl acetate (J. T. Baker, HPLC Grade) was cooled to 0° C. in an ice bath. Once cool, iodomethane (7.77 g, 54.7 mmol, Sigma-Aldrich, 99%) was added dropwise via addition funnel. The solution was allowed to warm slowly to room temperature. Stirring was continued for approximately 60 hours then the solution was filtered and the residue was washed with diethyl ether. The product dried under high vacuum overnight yielding 10.74 g (47.9 mmol, 96% yield) of white solids (used without further purification).

$^1$H NMR (300 MHz, DMSO-$d_6$): 9.07, 7.70, 3.85. $^{13}$C NMR (75 MHz, DMSO-$d_6$): 136.9, 123.4, 35.8. Analysis calculated for $C_5H_9IN_2$: C, 26.80; H, 4.05; N, 12.50 (C/N=2.14). Found: C, 26.90; H, 4.23; N, 12.31 (C/N=2.19).

Example 7. Synthesis of Structure Directing Agent 1,3-Diethylimidazolium Iodide (7)

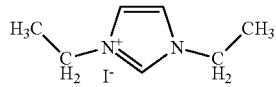

7

1-ethylimidazole (4.81 g, 50 mmol, Sigma-Aldrich, 99%) in 50 mL ethyl acetate was cooled to 0° C. in an ice bath. Once cool, iodoethane (8.69 g, 55.7 mmol, Sigma-Aldrich, 99%) was added dropwise via an addition funnel. The solution was allowed to warm slowly to room temperature then stirred overnight. The precipitate was filtered off and washed with diethyl ether. The filtrate was collected and an additional 8.96 g (57.4 mmol) iodoethane was added and stirring continued at room temperature for 6 days. The solution was filtered again and the residue was washed with diethyl ether. The combined solids were dried overnight under high vacuum yielding 9.76 g white solids (38.7 mmol, 77% yield) that were used without further purification.

$^1$H NMR (300 MHz, DMSO-$d_6$): 9.25, 7.83, 4.20, 1.42. $^{13}$C NMR (75 MHz, DMSO-$d_6$): 135.4, 122.1, 44.2, 15.1. Analysis calculated for $C_7H_{13}IN_2$: C, 33.35; H, 5.20; N, 11.11 (C/N=3.00). Found: C, 33.26; H, 5.29; N, 10.95 (C/N=3.04).

Example 8. Synthesis of Structure Directing Agent 1,3-Bis(tert-butyl)imidazolium Tetrafluoroborate (8)

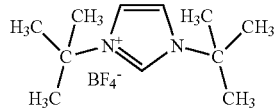

8

Tert-butylamine (7.32 g, 100 mmol, Alfa-Aesar, 98%) in 100 mL toluene (EMD, ACS Reagent) was placed in a room temperature water bath then paraformaldehyde (3.16 g, 100 mmol, Fisher, 95%) was added with strong stirring. The solution was stirred at room temperature for 30 min, then ice was added to the water bath. After cooling for 1 h another 7.32 g (100 mmol) tert-butylamine was added dropwise via addition funnel. Tetrafluoroboric acid (18.30 g, 100 mmol, Alfa-Aesar 48 wt. % in water) was diluted to 30 wt. % with 9.16 g water, then added dropwise via addition funnel. The ice bath was removed and the solution warmed for 30 min then glyoxal solution (14.488 g, 100 mmol, Alfa-Aesar, 40 wt. % in water) was added dropwise. The flask was heated at 40° C. overnight then allowed to cool to room temperature. The solution was filtered and the residue washed with 50 mL water and 100 mL diethyl ether then dried overnight under high vacuum yielding 13.28 g white solids (49.5 mmol, 50% yield) that were used without further purification.

$^1$H NMR (300 MHz, DMSO-$d_6$): 8.98, 8.05, 1.60. $^{13}$C NMR (75 MHz, DMSO-$d_6$): 132.2, 120.5, 59.6, 29.1. Analysis calculated for $C_{11}H_{21}BF_4N_2$: C, 49.28; H, 7.90; N, 10.45 (C/N=4.72). Found: C, 48.87; H, 8.18; N, 10.34 (C/N=4.73).

Example 9. Synthesis of Structure Directing Agent 1,3-Bis(pentan-3-yl)imidazolium Bromide (9)

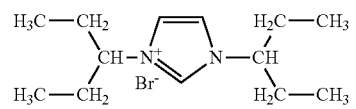

9

Using 3-aminopentane (2×70 mmol, Alfa-Aesar, 98%) the procedure described for compound 1, above, was followed yielding 14.82 g white solids (51.2 mmol, 73% yield). $^1$H NMR (300 MHz, DMSO-$d_6$): 9.75, 8.10, 4.24, 1.84, 0.70. $^{13}$C NMR (75 MHz, DMSO-$d_6$): 135.2, 121.3, 64.0, 27.2, 9.9. Analysis calculated for $C_{13}H_{25}BrN_2$: C, 53.98; H, 8.71; N, 9.68 (C/N=5.58). Found: C, 53.69; H, 8.57; N, 9.51 (C/N=5.64).

Example 10. Synthesis of Structure Directing Agent 1,3-Bis(cyclohexylmethyl)imidazolium Bromide (12)

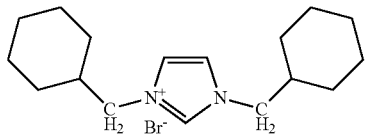

12

Using cyclohexanemethylamine (2×110.4 mmol, Alfa-Aesar, 98%) the procedure for compound 1, above, was followed yielding 26.57 g off-white waxy solids (77.8 mmol, 70% yield). When performing the activated carbon treatment 250 mL water plus 50 mL methanol was used to dissolve the residue.

$^1$H NMR (300 MHz, DMSO-$d_6$): 9.29, 7.82, 4.06, 1.79, 1.69-1.66, 1.52-1.48, 1.20-1.13, 0.99-0.91. $^{13}$C NMR (75 MHz, DMSO-$d_6$): 136.4, 122.8, 54.3, 37.5, 29.3, 25.6, 24.9. Analysis calculated for $C_{17}H_{29}BrN_2$: C, 59.82; H, 8.56; N, 8.21 (C/N=7.29). Found: C, 59.43; H, 8.35; N, 8.07 (C/N=7.37).

Example 11. Synthesis of Structure Directing Agent 1,3-Bis(2,4,4-trimethylpentan-2-yl)imidazolium Tetrafluoroborate (1,3-Bis(isooctyl)imidazolium Tetrafluoroborate) (13)

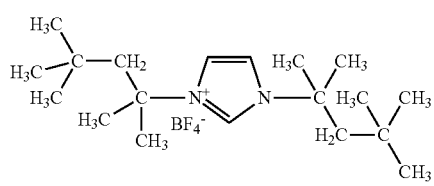

13

Using 2-amino-2,4,4-trimethylpentane (2×120 mmol, TCI America, 95%) the procedure for compound 2, above, was followed omitting Soxhlet extraction. Recrystallization from dichloromethane/tetrahydrofuran yielded 11.76 g off-white solids (30.9 mmol, 26% yield).

$^1$H NMR (300 MHz, DMSO-$d_6$): 9.19, 8.13, 1.95, 1.66, 0.79. $^{13}$C NMR (75 MHz, DMSO-$d_6$): 133.5, 120.9, 62.8, 52.7, 31.3, 30.3, 29.3. Analysis calculated for $C_{19}H_{37}BF_4N_2$: C, 60.00; H, 9.81; N, 7.37 (C/N=8.14). Found: C, 61.38; H, 9.94; N, 7.50 (C/N=8.18).

Example 12. Synthesis of Structure Directing Agent 1,3-Bis(cyclooctyl)imidazolium Bromide (10)

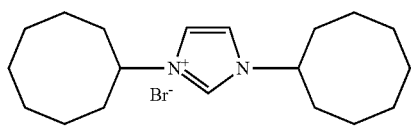

10

Using cyclooctylamine (2×98.3 mmol, Alfa-Aesar, 97+%) the procedure for compound 1 was followed yielding 20.315 g off-white solids (55.0 mmol, 56% yield). Similar to the procedure for compound 12, methanol was added during the activated carbon treatment to dissolve the residue. $^1$H NMR (300 MHz, DMSO-$d_6$): 9.50, 7.91, 4.56, 2.01-1.87, 1.67-1.55. $^{13}$C NMR (75 MHz, DMSO-$d_6$): 133.8, 120.9, 60.2, 32.3, 26.1, 24.9, 23.2. Analysis calculated for $C_{19}H_{33}BrN_2$: C, 61.78; H, 9.00; N, 7.58 (C/N=8.15). Found: C, 63.93; H, 9.79; N, 7.99 (C/N=8.00).

Example 13. Synthesis of Structure Directing Agent 1,3-Bis(1-adamantyl)imidazolium Bromide (11)

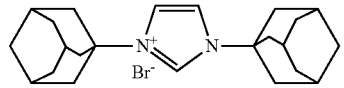

11

An aqueous solution of 1-adamantylamine hydrochloride (Alfa-Aesar, 99%) was treated with potassium hydroxide and extracted with toluene, dried over $Na_2SO_4$, filtered and stripped down by rotary evaporation to give 30.3 g 1-adamantylamine (200 mmol). The procedure for compound 1, above, was followed except the reaction was heated at 45° C. overnight yielding 26.23 g white solids (62.8 mmol, 63% yield). When performing the activated carbon treatment 2:1 water/absolute ethanol was used to dissolve the residue.

$^1$H NMR (300 MHz, $CD_3OD$): 9.02, 7.94, 2.27, 1.91, 1.85. $^{13}$C NMR (75 MHz, $CD_3OD$): 132.2, 120.6, 61.4, 43.4, 36.4, 31.0. Analysis calculated for $C_{23}H_{33}BrN_2$: C, 66.18; H, 7.97; N, 6.71 (C/N=9.86). Found: C, 62.37; H, 8.26; N, 6.44 (C/N=9.68).

Examples 14-26. Preparation of Molecular Sieves

Aluminum containing molecular sieves were prepared using SDAs 1-5 in the hydroxide form by preparing gel compositions with the molar ratios described in Tables 1 and 2. Examples 7 and 9-13 use NaY zeolite as the aluminum source. The gel is sealed in a PTFE lined Parr autoclave and heated in a convection oven at the indicated temperature.

All runs in Table 3 were static while those in Table 4 were rotated at 40 rpm. Products were analyzed by powder X-Ray Diffraction to determine the phase(s) present.

TABLE 3

Examples of Preparation of Molecular Sieves in Fluoride Media

| Example | SDA | $SiO_2$ | $Al_2O_3$ | $SDA^+OH^-$ | HF | $H_2O$ | Temperature, ° C. | Product |
|---|---|---|---|---|---|---|---|---|
| 14 | 1 | 1.0 | 0.033 | 0.5 | 0.5 | 15.0 | 150 | SSZ-70 |
| 15 | 1 | 1.0 | 0.020 | 0.5 | 0.5 | 15.0 | 150 | SSZ-70 |
| 16 | 1 | 1.0 | 0.0167 | 0.5 | 0.5 | 15.0 | 150 | SSZ-70 |
| 17 | 1 | 1.0 | 0.0143 | 0.5 | 0.5 | 15.0 | 150 | SSZ-70 + impurity |

TABLE 4

Examples of Preparation of Molecular Sieves in Hydroxide Media

| Example | SDA | $SiO_2$ | $Al_2O_3$ | $SDA^+OH^-$ | NaOH | $H_2O$ | Temperature, ° C. | Product |
|---|---|---|---|---|---|---|---|---|
| 18 | 1 | 1.0 | 0.020 | 0.20 | 0.10 | 30.0 | 150 | SSZ-70 |
| 19 | 1 | 1.0 | 0.010 | 0.20 | 0.10 | 30.0 | 150 | SSZ-70 |
| 20 | 2 | 1.0 | 0.029 | 0.20 | 0.05 | 30.0 | 150 | SSZ-70 + Beta |
| 21 | 2 | 1.0 | 0.010 | 0.20 | 0.10 | 30.0 | 150 | Beta + SSZ-70 |
| 22 | 3 | 1.0 | 0.029 | 0.20 | 0.05 | 30.0 | 150 | SSZ-70 |
| 23 | 3 | 1.0 | 0.029 | 0.20 | 0.05 | 30.0 | 170 | Beta + SSZ-70 |
| 24 | 4 | 1.0 | 0.029 | 0.20 | 0.05 | 30.0 | 150 | SSZ-70 |
| 25 | 4 | 1.0 | 0.029 | 0.20 | 0.05 | 30.0 | 170 | SSZ-70 |
| 26 | 5 | 1.0 | 0.029 | 0.20 | 0.05 | 30.0 | 150 | SSZ-70 |

X-Ray Diffraction

Figure 2:
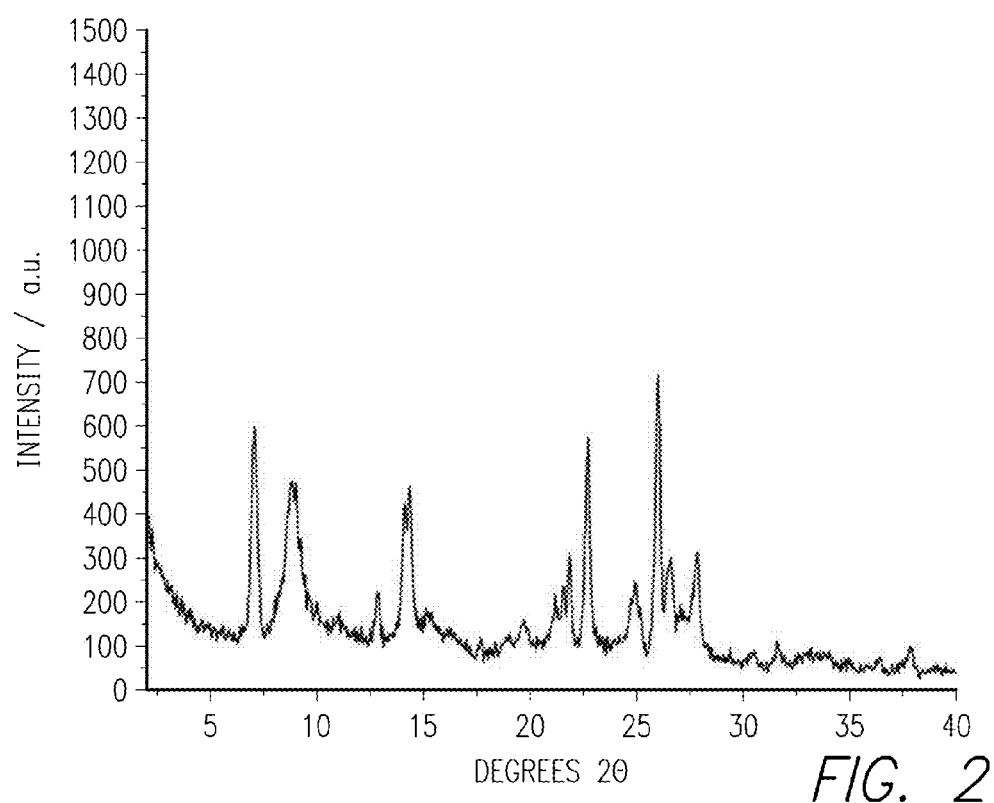
FIG. 2 illustrates an XRD pattern for one calcined product according to an embodiment of the present disclosure.
Figure 3:
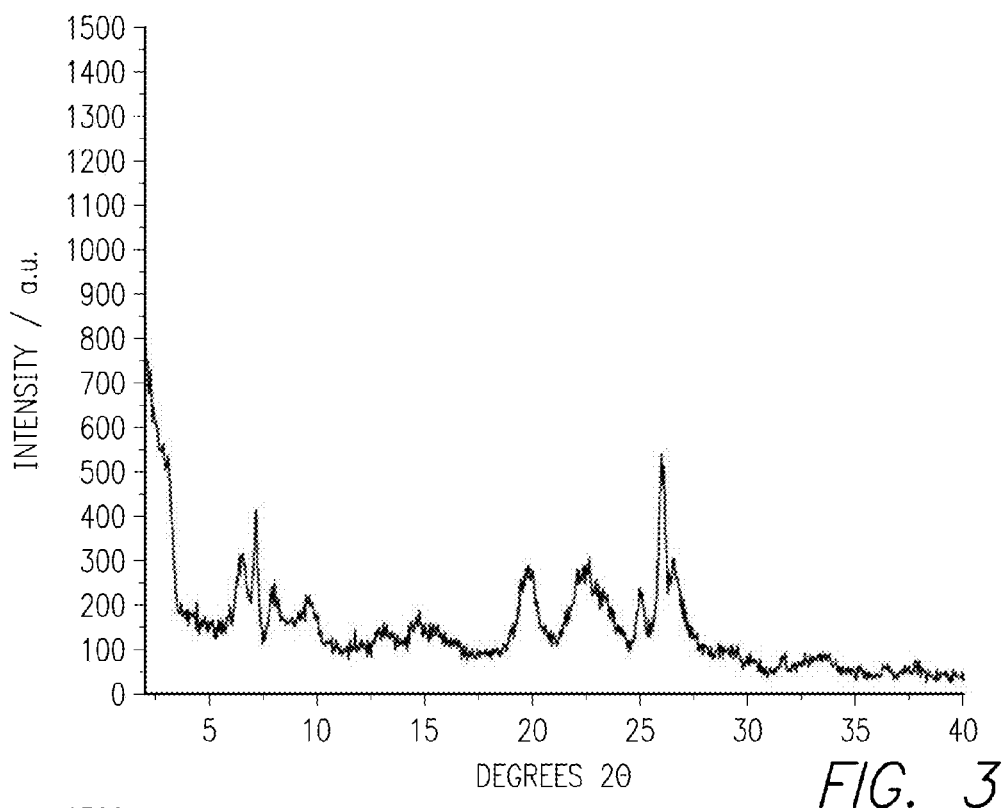
FIG. 3 illustrates an XRD pattern for another as-synthesized product according to an embodiment of the present disclosure.
Figure 4:
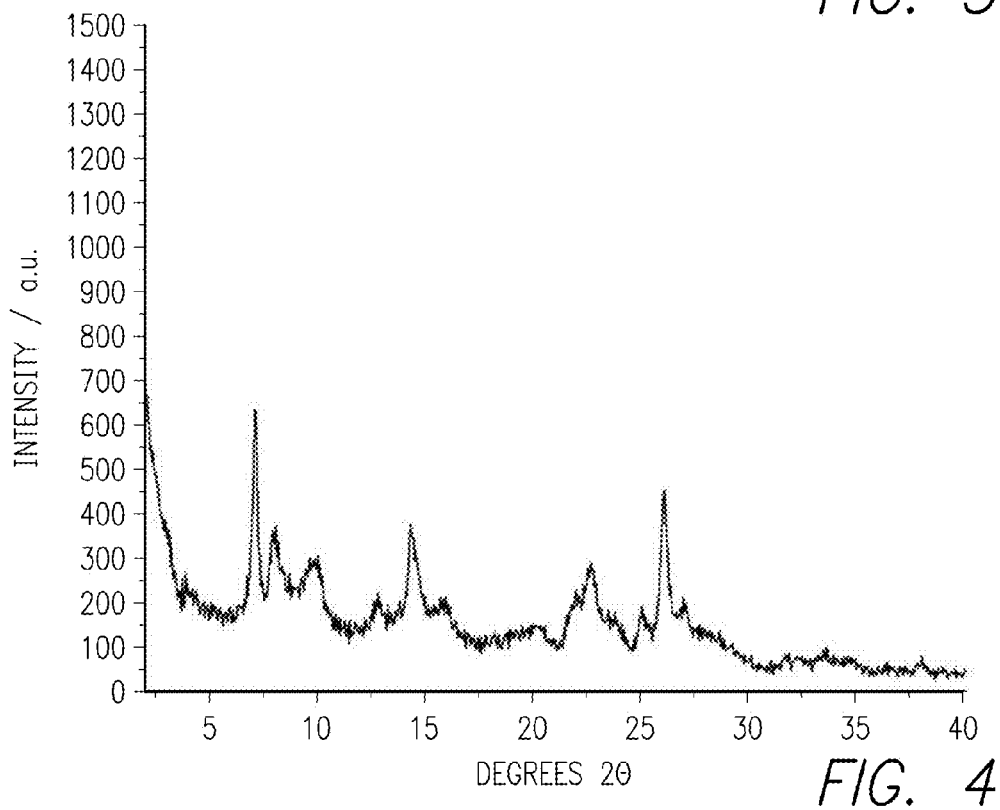
FIG. 4 illustrates an XRD pattern for another calcined product according to an embodiment of the present disclosure.

The XRD pattern for as-synthesized molecular sieve from Example 14 is shown in FIG. 1. The XRD pattern after calcination at 540° C. is shown in FIG. 2. The XRD pattern for as-synthesized molecular sieve from Example 18 is shown in FIG. 3. The XRD pattern after calcination at 550° C. is shown in FIG. 4.

Constraint Index Results

Figure 5:
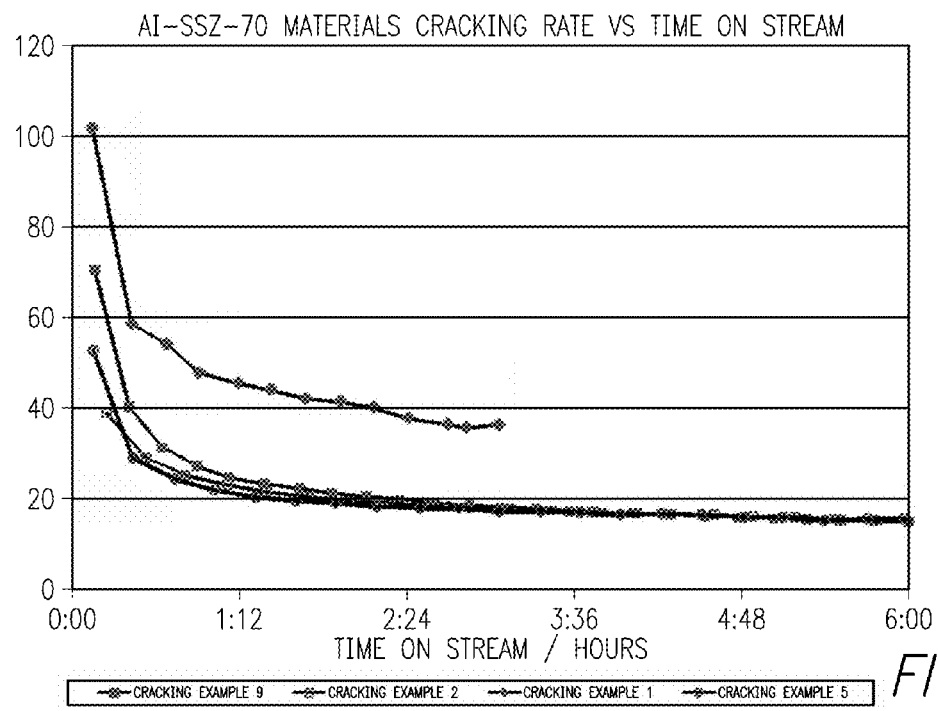
FIG. 5 illustrates cracking rate as a function of time on stream for some products according to embodiments of the present disclosure.
Figure 6:
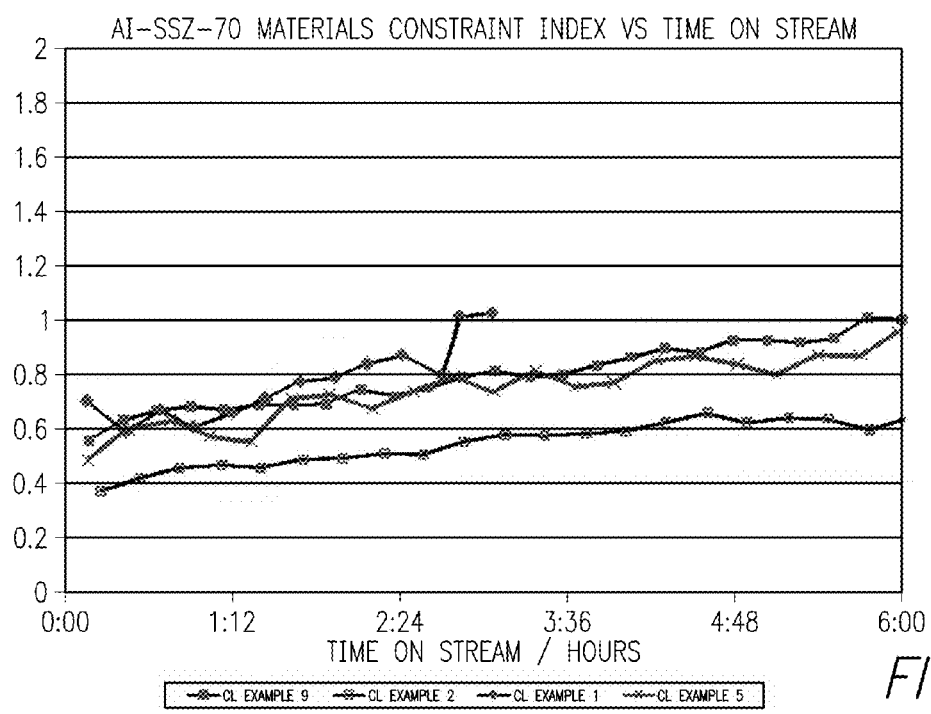
FIG. 6 illustrates constraint index as a function of time on stream for some products according to embodiments of the present disclosure.

The as-synthesized product from Example 24 was treated with 1N HCl at 100° C. (1 g solid to 10 mL HCl solution) for 48 hrs to neutralize any residual NaY zeolite, then calcined. The as-synthesized materials from Examples 14, 15 and 18 were calcined to remove occluded organic material. The calcined materials were contacted with 1M $NH_4NO_3$ solution, filtered and washed with water then dried. The ammonium exchanged materials were pelletized, crushed and sieved to 20-40 mesh. The materials were treated under flowing He overnight at ≥350° C. to create the hydrogen form. Results of Constraint Index tests are presented in FIG. 5 (showing cracking rate as a function of time on stream for Examples 14, 15, 18 and 24) and FIG. 6 (showing Constraint Index as a function of time on stream for Examples 14, 15, 18 and 24).

Micropore Volume

Micropore volumes for calcined materials from Examples 14 and 18 were obtained using nitrogen at 77K on a Micromeritics ASAP 2000 instrument. The ammonium exchanged calcined materials were degassed at 350° C. overnight before analysis. Micropore volumes were calculated by selecting the t-plot method option in the instrument software. The results are shown in Table 5

TABLE 5

Micropore volume for Al-SSZ-70 materials

| Example Describing the Molecular Sieve | Micropore Volume, $cm^3g^{-1}$ |
|---|---|
| 14 | 0.20 |
| 18 | 0.14 |

Examples 27-72. Phases Obtained from the Initial Inorganic Reactions

Figure 7:
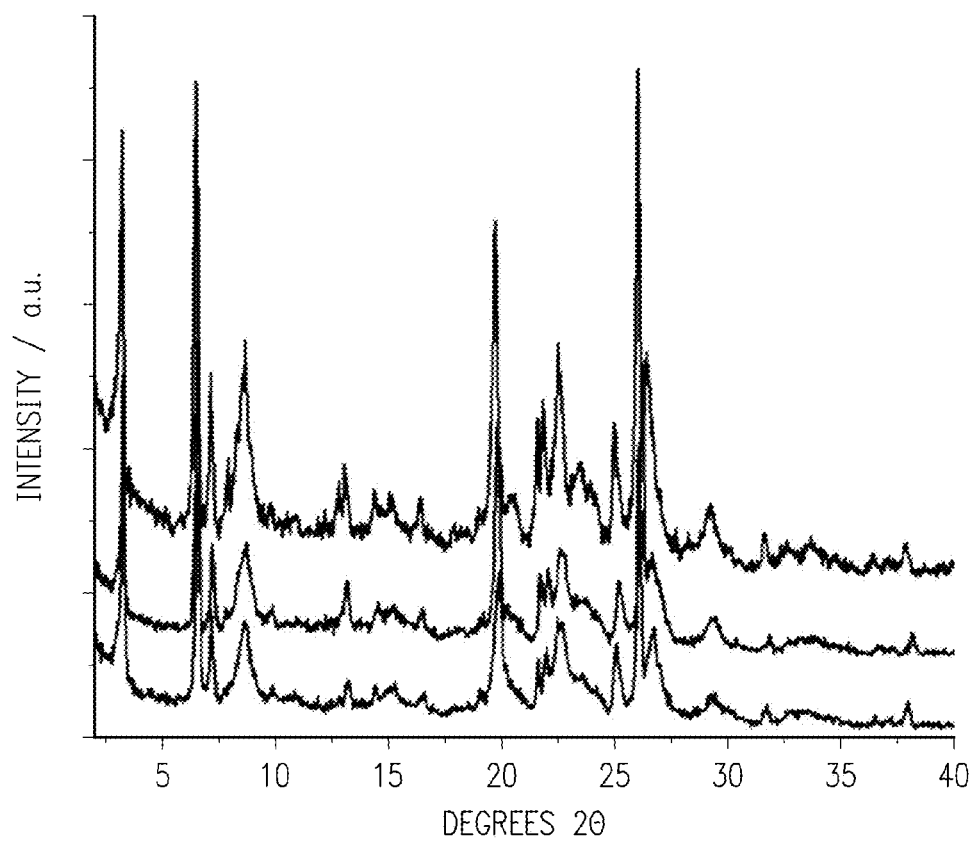
FIG. 7 provides additional illustration of XRD patterns for additional as-synthesized products according to an embodiment of the present disclosure.
Figure 8:
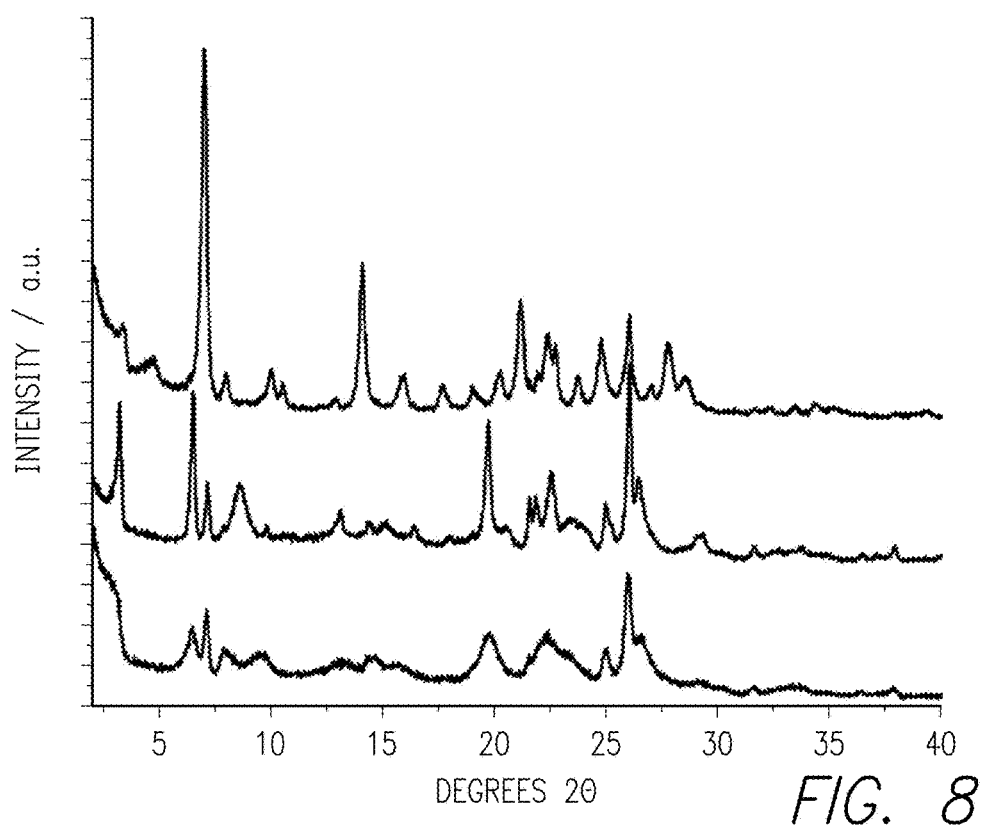
FIG. 8 illustrates XRD patterns for additional as-synthesized products according to an embodiment of the present disclosure (SSZ-25 (top), Al-SSZ-70(F) (middle), and Al-SSZ-70(OH) (bottom)).

The phases obtained from the initial inorganic reaction screen at 150° C. are presented in Tables 5-9 and are further illustrated by FIGS. 7 and 8. FIG. 7 presents additional data on initial SSZ-70 characterization and illustrates XRD patterns for as-synthesized SSZ-70 from fluoride reactions using SDA compound 1. The charts on FIG. 7 represent, top to bottom, Al-SSZ-70, B-SSZ-70 and Si-SSZ-70. The XRD patterns of SSZ-70 in FIG. 7 show low angle reflections at approximately 3.3, 6.6, 7.2, and 8.6° 2θ. The first reflection corresponds to approximately 27 Å d-spacing and the relatively broad features suggest few repeat units are contained in each crystallite.

These features are consistent with a layered material and this is further supported by SEM images showing thin interpenetrated plates as presented in FIG. 8, which is scanning electron micrograph of Si-SSZ-70 from fluoride reaction using SDA compound 3.

Results from using pure-silica fluoride reaction conditions are listed in Table 6 and show that SSZ-70 is formed with SDA compounds 1-5. As can be seen, such phases as BEA* and MTW appear frequently, with BEA* particularly common at $_{H2}O/Si_{O2}$=3.5. The entry for bis(cyclopentyl) SDA (i.e., compound 2) at $_{H2}O/Si_{O2}$=14.5 displayed a transition from layered SSZ-70 plus EUO at 52 days to EUO plus minor SSZ-70 upon further heating to 72 days. The intermediate dilution reaction was also heated to 72 days with only SSZ-70 present.

TABLE 6

Phases Obtained From Pure-Silica Fluoride Reactions at 150° C.

| | | $H_2O/SiO_2$ | | |
|---|---|---|---|---|
| Example | SDA | 3.5 | 7.5 | 14.5 |
| 27 | 6 | TON | TON | TON |
| 28 | 7 | TON | TON | TON |
| 29 | 8 | BEA* | BEA* | Amorphous |
| 30 | 1 | SSZ-70 | SSZ-70 | MTW |
| 31 | 9 | MTW | MTW | MTW |
| 32 | 2 | BEA* | SSZ-70 | SSZ-70/EOU |
| 33 | 3 | BEA* | SSZ-70 | SSZ-70 |
| 34 | 4 | BEA* | SSZ-70 | SSZ-70 |
| 35 | 5 | NR[x)] | SSZ-70 | NR[x)] |
| 36 | 12 | BEA* | BEA* | MTW |
| 37 | 13 | Amorphous | Amorphous | Amorphous |
| 38 | 10 | BEA* | BEA* | BEA* |
| 39 | 14 | Amorphous | Amorphous | Amorphous |
| 40 | 11 | CFI | CFI | CFI |
| 41 | 15 | Amorhpous | NR[x)] | NR[x)] |

[x)]Not run

TABLE 7

Phases Obtained From Borosilicate Hydroxide Reactions at 150° C.

| | | $SiO_2/B_2O_3$ | | | |
|---|---|---|---|---|---|
| Example | SDA | 8 | 50 | 100 | ∞ |
| 42 | 6 | Amorphous | NR[x)] | NR[x)] | TON |
| 43 | 7 | MFI | NR[x)] | NR[x)] | TON |
| 44 | 8 | Amorphous | Kanemite | Kanemite | Kanemite |
| 45 | 1 | SSZ-70 | SSZ-70 | SSZ-70 | MTW + SSZ-70 |
| 46 | 9 | Amorphous | MTW | MTW | MTW |
| 47 | 2 | SSZ-70 | SSZ-70 | SSZ-70 | SSZ-70 |
| 48 | 3 | SSZ-70 | SSZ-70 | SSZ-70 | SSZ-70 |
| 49 | 4 | SSZ-70 | SSZ-70 | SSZ-70 | SSZ-70 |
| 50 | 5 | NR[x)] | SSZ-70 | NR[x)] | SSZ-70 |
| 51 | 12 | SSZ-70 + BEA* | SSZ-70 | MTW | MTW |
| 52 | 10 | BEA* | BEA* | BEA* | Quartz + Kanemite |
| 53 | 11 | Amorphous[a)] | Layered[b)] | Kanemite | Layered[b)] |

[x)]Not run
[a)]$SiO_2/B_2O_3$ = 12
[b)]Sharp XRD reflections <6° 2θ that do not persist on calcination

TABLE 8

Phases Obtained From Alumosilicate Hydroxide Reactions at 150° C.

| | | $SiO_2/Al_2O_3$ | | | |
|---|---|---|---|---|---|
| Example | SDA | 35 (y = 0.25) | 35 (y = 0.05) | 50 | 100 |
| 54 | 8 | MOR | Amorphous (NaY[xx)]) | Amorphous | Amorphous |
| 55 | 1 | BEA* (MOR) | MTW (NaY[xx)]) | SSZ-70 | SSZ-70 |

TABLE 8-continued

Phases Obtained From Alumosilicate Hydroxide Reactions at 150° C.

| | | SiO$_2$/Al$_2$O$_3$ | | | |
|---|---|---|---|---|---|
| Example | SDA | 35 (y = 0.25) | 35 (y = 0.05) | 50 | 100 |
| 56 | 9 | MTW (MOR) | MTW (NaY$^{xx)}$) | Amorphous | MTW + Amorphous |
| 57 | 2 | BEA* | SSZ-70 + BEA* | BEA* | BEA* + SSZ-70 |
| 58 | 3 | BEA* (MOR) | SSZ-70 (NaY$^{xx)}$/ MOR) | BEA* | BEA* |
| 59 | 4 | BEA* (MOR) | SSZ-70 | BEA* | BEA* |
| 60 | 5 | NR$^{x)}$ | SSZ-70 + BEA* | NR$^{x)}$ | BEA* |
| 61 | 12 | BEA* + MOR (NaY$^{xx)}$) | MTW (NaY$^{xx)}$) | BEA* | BEA* |
| 62 | 13 | Magadiite (NaY$^{xx)}$) | Amorphous (NaY$^{xx)}$)$^{a)}$ | NR$^{x)}$ | Amorphous |
| 63 | 10 | BEA* (MOR) | BEA*(NaY$^{xx)}$) | BEA* | BEA* |
| 64 | 14 | NR$^{x)}$ | Amorphous$^{a)}$ | NR$^{x)}$ | NR$^{x)}$ |
| 65 | 11 | MOR | AFX (NaY$^{xx)}$) | Amorphous | STF |
| 66 | 15 | NR$^{x)}$ | Amorphous$^{a)}$ | NR$^{x)}$ | NR$^{x)}$ |

$^{x)}$Not run
$^{a)}$NaOH/SiO$_2$ = 0.10.
$^{xx)}$NaY was used as the aluminum source in these reactions

TABLE 9

Phases Obtained From Pure-Silica Fluoride Reactions at 175° C.

| | | H$_2$O/SiO$_2$ | | |
|---|---|---|---|---|
| Example | SDA | 3.5 | 7.5 | 14.5 |
| 67 | 1 | BEA* + SSZ-70 | MTW | MTW |
| 68 | 3 | BEA* | SSZ-70 | EOU (SSZ-70)$^{a)}$ |
| 69 | 4 | BEA* | SSZ-70 | SSZ-70 |

$^{a)}$Phase in parenthesis indicates minor impurity

TABLE 10

Phases Obtained From Hydroxide Synthesis at 170° C.

| | | SiO$_2$/B$_2$O$_3$ | | SiO$_2$/Al$_2$O$_3$ | |
|---|---|---|---|---|---|
| | | | | 35 | |
| Example | SDA | 50 | 100 | ∞ (y = 0.05) | 50 |
| 70 | 1 | MTW | MTW | MTW | SSZ-70 + MTW | SSZ-70 + Amorphous |
| 71 | 3 | SSZ-70 | SSZ-70 | SSZ-70 | BEA* + SSZ-70 | BEA* |
| 72 | 4 | SSZ-70 | SSZ-70 | SSZ-70 | SSZ-70 | BEA* |

Example 73. Synthesis and Characterization of SSZ-70

Tables 11 and 12 present the conditions used for synthesizing SSZ-70. When possible, characterization was performed on SSZ-70 materials synthesized using the same SDA. Most reactions employed bis-(isobutyl) SDA 1, as this molecule was capable of synthesizing pure silica, borosilicate, and aluminosilicate SSZ-70. The pure silica fluoride reaction using SDA 1 at a high water to silica ratio was also included for chemical analysis comparison. SDA 1 did not make pure Si-SSZ-70 under hydroxide mediated reaction conditions; therefore, Si-SSZ-70(OH) using bis-(cyclohexyl) SDA 3 or bis-(cycloheptyl) SDA 4 were employed. Products were denoted with (OH) or (F) to indicate the appropriate synthesis conditions. Nitrogen adsorption experiments were conducted with Si-SSZ-70(OH) synthesized using SDA 3 while $^{29}$Si NMR analyses were with Si-SSZ-70 (F) and Si-SSZ-70 (OH) synthesized using SDA 4. Hydrocarbon adsorption was performed with Al-SSZ-70 (F) synthesized using SDA 1 (entry 5 in Table 11).

TABLE 11

Fluoride Reaction Conditions for the Synthesis of SSZ-70

| SDA | SiO$_2$(Al$_2$O$_3$, B$_2$O$_3$) | H$_2$O/SiO$_2$ | Result |
|---|---|---|---|
| 1 | ∞ | 3.5 | Si-SSZ-70 |
| 1 | ∞ | 7.5 | Si-SSZ-70 |
| 1 | ∞ | 14.5 | MTW |
| 1 | 30 | 15.5 | Al-SSZ-70 |
| 1 | 50 | 15.5 | Al-SSZ-70 |
| 1 | 70 | 15.5 | Al-SSZ-70 |
| 1 | 11 | 15.5 | B-SSZ-70 |
| 1 | 36 | 15.5 | B-SSZ-70 |
| 4 | ∞ | 14.5 | Si-SSZ-70 |

TABLE 12

Hydroxide Mediated Reaction Conditions for the Synthesis of SSZ-70

| SDA | SiO$_2$(Al$_2$O$_3$, B$_2$O$_3$) | Result |
|---|---|---|
| 1 | 50 | Al-SSZ-70 |
| 1 | 100 | Al-SSZ-70 |
| 1 | 8 | B-SSZ-70 |
| 3 | 35 | Al-SSZ-70 |
| 3 | ∞ | Si-SSZ-70 |
| 4 | ∞ | Si-SSZ-70 |

Figure 9:
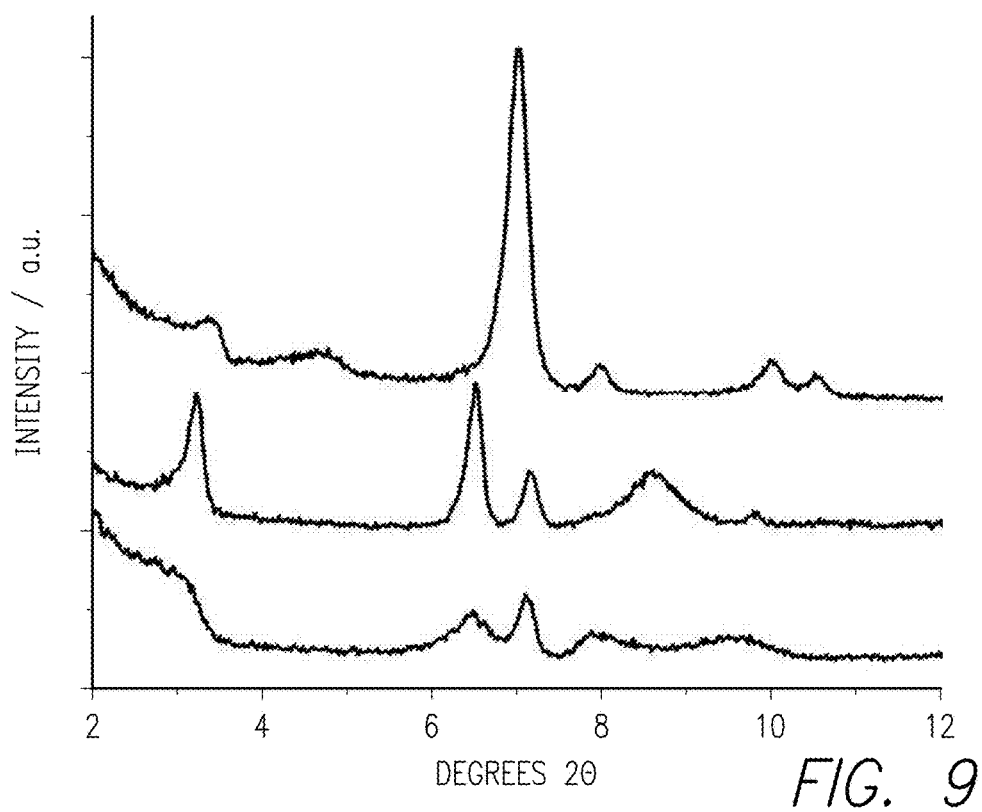
FIG. 9 illustrates XRD patterns for additional as-synthesized products according to an embodiment of the present disclosure (SSZ-25 (top), Al-SSZ-70(F) (middle), and Al-SSZ-70(OH) (bottom)).
Figure 10:
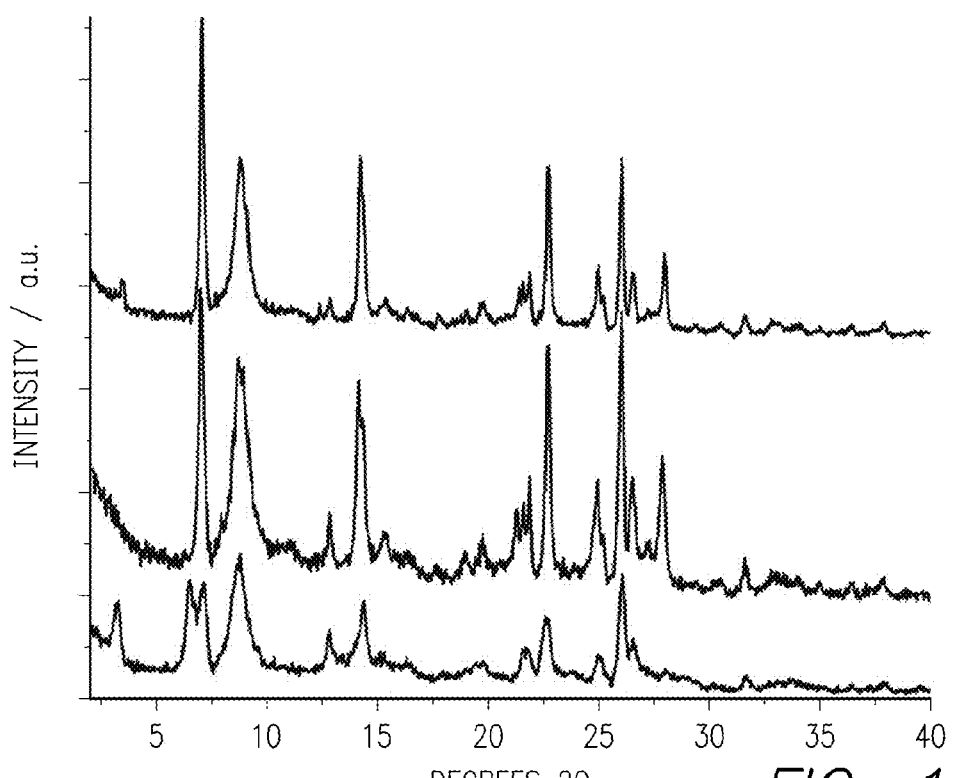
FIG. 10 illustrates XRD patterns for additional calcined products according to an embodiment of the present disclosure (Si-SSZ-70(F) (top), Al-SSZ-70(F) (middle), and B-SSZ-70(F) (bottom)).

Powder XRD patterns are shown in FIGS. 8-10 for as-made and calcined SSZ-70. Inspection of the powder XRD pattern reveals similarity to those obtained from MWW precursor materials. FIG. 8 shows XRD patterns for as-made Al-SSZ-70 synthesized in fluoride and hydroxide media using SDA 1 (Al-SSZ-70(F) and Al-SSZ-70-(OH), respectively). Also included in FIG. 8 is the XRD pattern of as-made SSZ-25 as a representative MWW material.

All three materials give quite sharp reflections at 26° 2θ, indicating similar structural features can be present in both materials. While some similarities were apparent between MWW and SSZ-70 from the XRD patterns (as illustrated in FIG. 8), there were no instances of MWW from any of the many syntheses performed with the 16 imidazolium SDAs studied across 160 inorganic reactions (Archer, R. H.; Zones, S. I.; Davis, M. E. *Microporous Mesoporous Mater.* 130 (2010) 255-265).

FIG. 9 is an enlargement of the XRD patterns illustrated in FIG. 8 in the 2–12° 2θ range. The pattern for the as-made product shows one reflection with large d-spacing (3.22° 2θ, 27.4 Angstrom), and several integer divisors are also present. The pattern for Al-SSZ-70(OH) is considerably broader than both SSZ-25 and Al-SSZ-70(F) with the low angle reflection appearing as a weak shoulder. Broad reflections in the hydroxide material were likely due to smaller crystal size (from SEM results). Inspection of the low-angle features in FIG. 9 reveals higher d-spacings for SSZ-70 compared to MWW materials. Higher d-spacings in this region of the XRD patterns compared to MWW were also reported for ITQ-30 (Corma, A.; Diaz-Cabanas, M. J.; Moliner, M.; Martinez, C. *J. Catal.* 2006, 241(2), 312-318). Comparing the patterns for hydroxide- and fluoride-mediated products reveals the same d-spacing for all reflections except one broad reflection at 8.7° 2θ for the fluoride product whereas the hydroxide product gives two reflections at 7.9 and 9.5° 2θ.

This diffraction intensity difference could be due to differences in crystal size along the c-direction (orthogonal to layers) as observed in DIFFaX simulations of MCM-22 and MCM-56 (Juttu, G. G.; Lobo, R. F. *Microporous Mesoporous Mater.* 2000, 40 (1-3), 9-23). FIG. 10 shows XRD patterns for calcined SSZ-70 materials synthesized in fluoride media using SDA 1. Shown are pure silica (Si-SSZ-70 (F)), borosilicate (B-SSZ-70(F)), and aluminosilicate (Al-SSZ-70(F)) materials. For both Si-SSZ-70(F) and Al-SSZ-70(F), the two low-angle reflections present in the as-made material (3.2 and 6.5° 2θ) were absent or appear with reduced intensity after calcination. The first significant reflection occurs at 7.0° 2θ (~12.5 Angstrom) in both materials. In contrast, the low-angle reflections (3.2 and 6.5° 2θ) persist after calcination for BSSZ-70(F) albeit with lower relative intensity. Both low angle reflections were not observed after calcining B-SSZ-70(OH).

Figure 11:
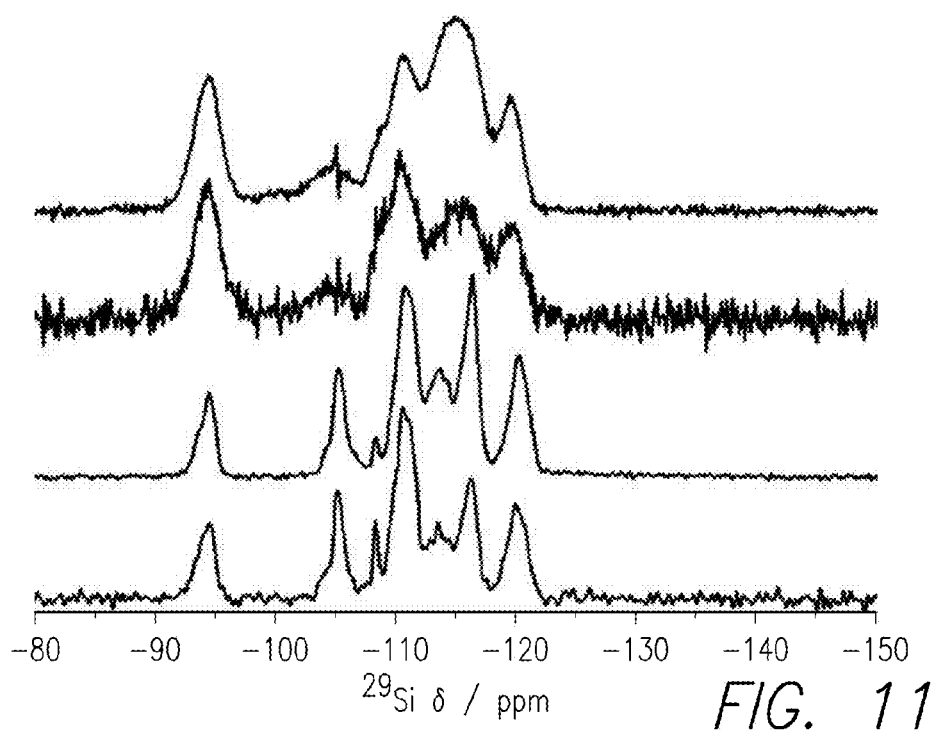
FIG. 11 illustrates solid-state 29SiNMR spectra of product Si-SSZ-70 obtained according to an embodiment of the present disclosure. Top to bottom: Si-SSZ-70(OH) CP-MAS, Si-SSZ-70(OH) BD-MAS, Si-SSZ-70(F) CPMAS, and Si-SSZ-70(F) BD-MAS.
Figure 12:
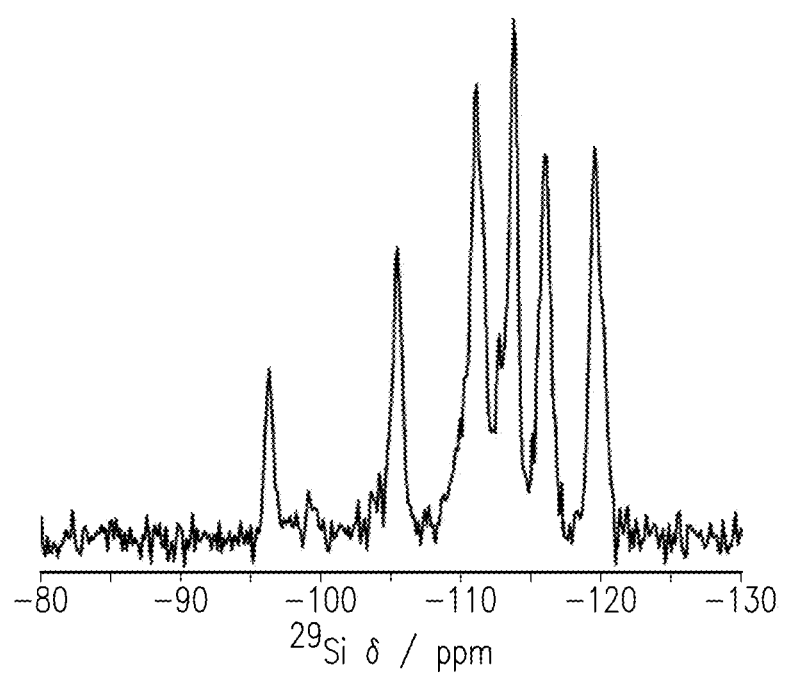
FIG. 12 illustrates solid-state 29Si BD-MAS NMR of calcined product Si-SSZ-70(F) obtained according to an embodiment of the present disclosure.

Solid-state 29Si NMR was performed on Si-SSZ-70(F) and Si-SSZ-70(OH). Spectra were collected on samples obtained using bis(cycloheptyl) SDA 4. FIG. 11 shows $^1$H-$^{29}$Si cross-polarization magic angle spinning (CP MAS) and 29Si Bloch decay (BD MAS) spectra of as-made Si-SSZ-70 samples. Both spectra for as-made solids show significant Q3 silicon content –94 ppm resonance). A comparison of the CP and BD spectra reveal a higher relative intensity for the –116 and –120 ppm resonances under CP conditions (2 ms contact time) and a relative decrease for the –108 ppm resonance. The resonances in the fluoride-mediated sample are well-defined and span a similar chemical shift range to those reported for ITQ-1 (Camblor, M. A.; Corma, A.; Diaz-Cabanas, M. J.; Baerlocher, C. *J. Phys. Chem. B* 1998, 102(1), 44-51. Camblor, M. A.; Corell, C.; Corma, A.; Diaz-Cabanas, M. J.; Nicolopoulos, S.; Gonzalez-Calbet, J. M.; Vallet-Regi, M. *Chem. Mater.* 1996, 8(10), 2415-2417). The spectrum of calcined Si-SSZ-70(F) illustrated in FIG. 12 shows six well resolved resonances with a small amount of $Q^3$ silicon still present.

Table 13 lists the observed chemical shifts for as-made Si-SSZ-70 materials. Relative intensity was determined by integration of the BD MAS spectra.

TABLE 13

Si Chemical Shifts and Relative Intensities for As-Made Si-SSZ-70(OH), Si-SSZ-70(F), and ITQ-1

| Si-SSZ-70 (OH) | | Si-SSZ-70 (F) | | ITQ-1 | | |
|---|---|---|---|---|---|---|
| δ, ppm | I, % | δ, ppm | I, % | δ, ppm | Assignment | I, % |
|  |  |  |  | 92.6 | $Q^3$ | 12.0 |
| –94.1 | 22.1 | –94.6 | 10.5 | 94.1 | $Q^3$ | 19.0 |
| –104.3 | 6.4 | –105.2 | 11.5 | –103.7 | $Q^3$ | 1.9 |
| –110.4 | 30.1 | –108.3 | 4.9 | –105.0 | $Q^4$ | 2.8 |
| –115.6 | 27.9 | –110.6 | 30.5 | –108.3 | $Q^4$ | 1.7 |
| –119.7 | 13.5 | –113.5 | 12.1 | –110.1 | $Q^4$ | 27.8 |
|  |  | –116.3 | 15.6 | –112.4 | $Q^4$ | 2.5 |
|  |  | –119.9 | 14.8 | –114.7 | $Q^4$ | 10.7 |
|  |  |  |  | –116.7 | $Q^4$ | 10.1 |
|  |  |  |  | –119.8 | $Q^4$ | 11.5 |

In general, the resonances for Si-SSZ-70 samples are not as well resolved as those for ITQ-1. This was particularly true for the hydroxide mediated sample. No attempt was made to deconvolute the spectra as the limited resolution did not warrant this. Therefore, fewer chemical shifts are included in Table 13. Inspecting the relative intensities shows a significant population of $Q^3$ silica species in both hydroxide- and fluoride-mediated samples. The resonance <–100 ppm for each sample can be assigned as $Q^3$, but there was some ambiguity regarding the resonances near –105 ppm. The spectrum for calcined Si-SSZ-70(F) illustrated in FIG. 12 clearly shows the –105 ppm resonance, whereas the –95 ppm resonance is significantly diminished. This result suggests the –105 ppm resonance to be $Q^4$ in order to give a relative $Q^3$ abundance of ~10% in the as-made material.

The broad resonance centered at –104 ppm for the hydroxide mediated material could not be conclusively assigned to either $Q^3$ or $Q^4$ giving an estimated relative $Q^3$ population of ~22-28%. The upper estimate for $Q^3$ content in the hydroxide mediated sample is in general agreement with those reported for ITQ-1 (29-33%). For as-made Si-SSZ-70(F), there was no analogous material to compare the relative $Q^3$ population as fluoride reactions generally produce solids with very few defects (low $Q^3$). In addition, no evidence of $SiO_{4/2}F$ species was observed between –130 and –150 ppm in as-made Si-SSZ-70(F). Chemical analysis did show fluorine incorporation as discussed below.

The exact nature of the fluoride species present in Si-SSZ-70 is not clearly understood, although a report of MWW synthesis with alkali fluoride salts proposed $SiO_{3/2}F$ can be present (Aiello, R.; Crea, F.; Testa, F.; Demortier, G.; Lentz, P.; Wiame, M.; Nagy, J. B. *Microporous Mesoporous Mater.* 2000, 35-6, 585-595). With this interpretation, fluorine can substitute for surface hydroxyl groups and therefore skew the relative $Q^3/Q^4$ ratio. It should be noted that $^{19}$F MAS NMR revealed one dominant resonance at –69 ppm (data not shown) with this in the expected range for $SiO_{4/2}F$ (Koller, H.; Wolker, A.; Villaescusa, L. A.; Diaz-Cabanas, M. J.; Valencia, S.; Camblor, M. A. *J. Am. Chem. Soc.* 1999, 121(14), 3368-3376).

The chemical shifts and relative intensities for calcined Si-SSZ-70(F) presented in Table 14 show several differences.

TABLE 14

Si Chemical Shifts and Relative Intensities for CalcinedSi-SSZ-70(F) and ITQ-1

| Si-SSZ-70 (F) | | ITQ-1 | | |
|---|---|---|---|---|
| δ, ppm | I, % | δ, ppm | Assignment | I, % |
| −96.3 | 4.6 | | | |
| −105.4 | 11.5 | −105.9 | $Q^4$ | 15.1 |
| −111.0 | 25.9 | −111.2 | $Q^4$ | 15.1 |
| −113.7 | 23.1 | −111.8 | $Q^4$ | 4.9 |
| −116.0 | 17.3 | −112.6 | $Q^4$ | 7.6 |
| −119.5 | 17.6 | −113.9 | $Q^4$ | 19.0 |
| | | −116.5 | $Q^4$ | 18.9 |
| | | −120.3 | $Q^4$ | 19.4 |

As mentioned above, calcination did not completely remove all $Q^3$ species. In addition, the resonance of the as-made product at −108.3 ppm is not visible in the spectrum of the calcined product. These observations plus the fact that the relative decrease in intensity in the $^1H$-$^{29}Si$ spectrum can indicate the presence of $SiO_{3/2}F$ species. The observed chemical shifts and relative intensities show similarity to those of ITQ-1.

Figure 13:
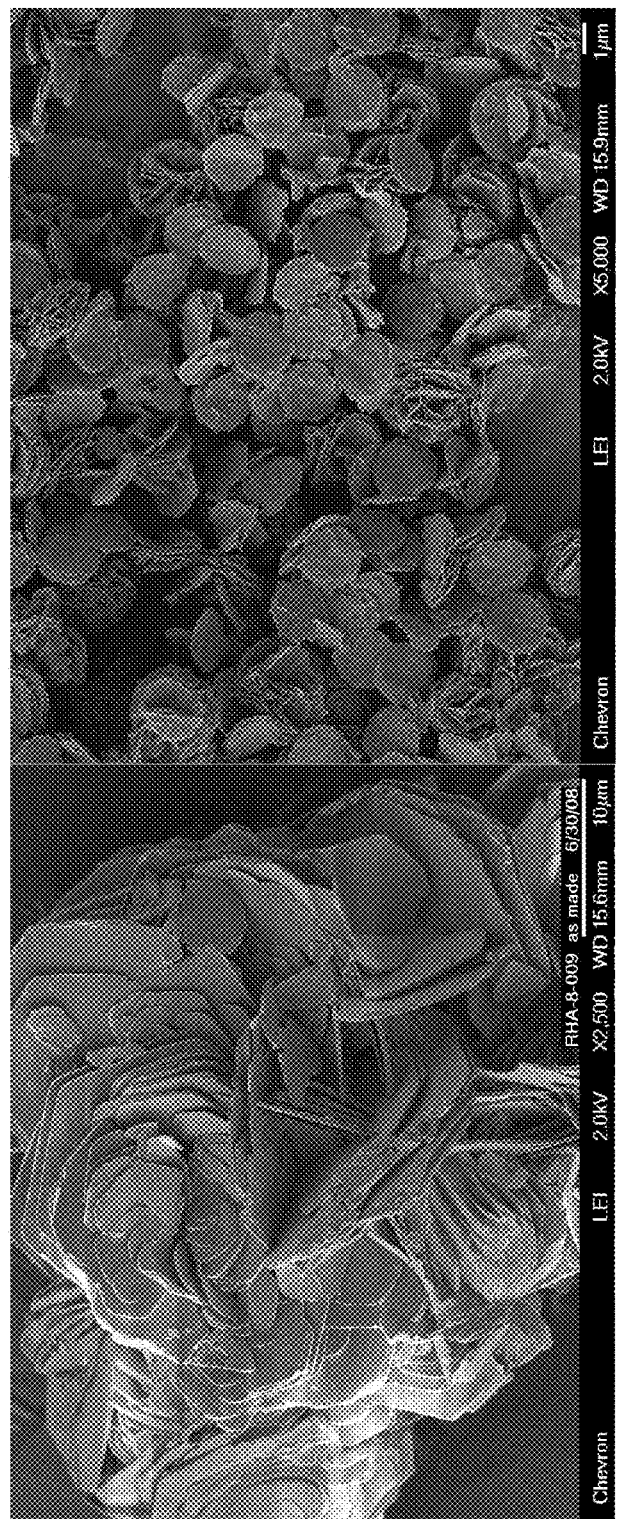
FIG. 13 is a scanning electron micrograph of as-synthesized Si-SSZ-70(F) (left) and calcined Al-SSZ-70(OH) (right) obtained according to embodiments of the present disclosure. The scale bar represents 10 and 1 μm for the left and right images, respectively.
Figure 14:
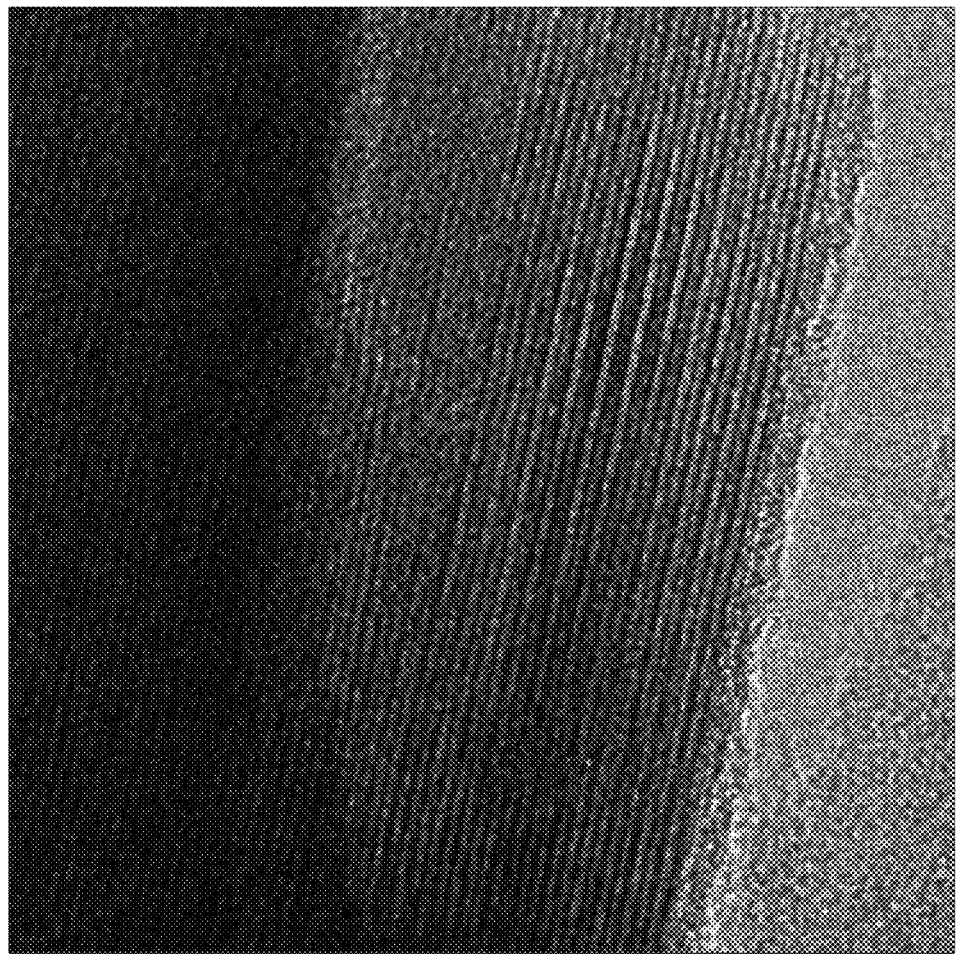
FIG. 14 is a transmission electron micrograph of one as-synthesized product according to an embodiment of the present disclosure.

SEM images of Si-SSZ-70(F) and Al-SSZ-70(OH) are shown in FIG. 13. Thin hexagonal plates were visible in the fluoride-mediated reaction product. In comparison, the hydroxide-mediated product revealed significantly smaller crystallites. MWW materials form crystals with similar morphology. The observed crystal morphology supports the similarity to MWW materials (similarities also observed by XRD and $^{29}Si$ NMR). FIG. 14 shows a transmission electron microscopy (TEM) image of B-SSZ-70 with a view through the edges of the crystal plates. The layers are clearly observed. Images at higher magnification did not show pore features as observed for MCM-22 (Leonowicz, M. E.; Lawton, J. A.; Lawton, S. L.; Rubin, M. K. *Science* 1994, 264(5167), 1910-1913) and SSZ-25 (Chan, I. Y.; Labun, P. A.; Pan, M.; Zones, S. I. *Microporous Mater.* 1995, 3(4-5), 409-418).

Chemical analyses were performed on SSZ-70 materials to gain further insights. All samples were synthesized using bis(isobutyl) SDA 1. Also included was pure-silica MTW synthesized at $H_2O/SiO_2$=14.5, representing typical fluoride mediated reaction products. Table 15 presents chemical analysis data for pure-silica products from fluoride mediated reactions, and Table 16 contains chemical analysis for B-SSZ-70 and Al-SSZ-70 materials.

TABLE 15

Carbon, Nitrogen, and Fluorine Content for Pure-Silica Products from Fluoride Mediated Reactions Using SDA 1

| | $H_2O/SiO_2$ = 3.5 (SSZ-70) | $H_2O/SiO_2$ = 7.5 (SSZ-70) | $H_2O/SiO_2$ = 14.5 (MTW) |
|---|---|---|---|
| C, wt % | 11.91 | 13.65 | 6.94 |
| N, wt % | 2.41 | 2.79 | 1.43 |
| F, wt % | 0.69 | 0.83 | 1.06 |
| C/N | 5.76 | 5.71 | 5.66 |
| F/N | 0.21 | 0.22 | 0.55 |

TABLE 16

Chemical Analysis of B-SSZ-70(F), Al-SSZ-70(F), and Al-SSZ-70(OH)

| | Gel Composition Ration | | | | | | |
|---|---|---|---|---|---|---|---|
| | Si/B = 18 | Si/B = 5.5 | Si/Al = 35 | Si/Al = 25 | Si/Al = 15 | Si/Al = 50 | Si/Al = 25 |
| C, wt % | 13.67 | 13.51 | 12.23 | 13.07 | 13.54 | 13.62 | 13.37 |
| N, wt % | 2.80 | 2.77 | 2.57 | 2.71 | 2.70 | 2.80 | 2.81 |
| F, wt % | 1.16 | 1.04 | 0.70 | 0.64 | 0.82 | | |
| C/N | 5.7 | 5.7 | 5.6 | 5.6 | 5.8 | 5.8 | 5.6 |
| F/N | 0.31 | 0.28 | 0.20 | 0.18 | 0.22 | | |
| Na, wt % | | | | | | 0.17 | 0.14 |
| Si/B | 21.7 | 13.7 | | | | | |
| Si/Al | | | 34.1 | 25.5 | 16.6 | 44.4 | 22.2 |

Figure 15:
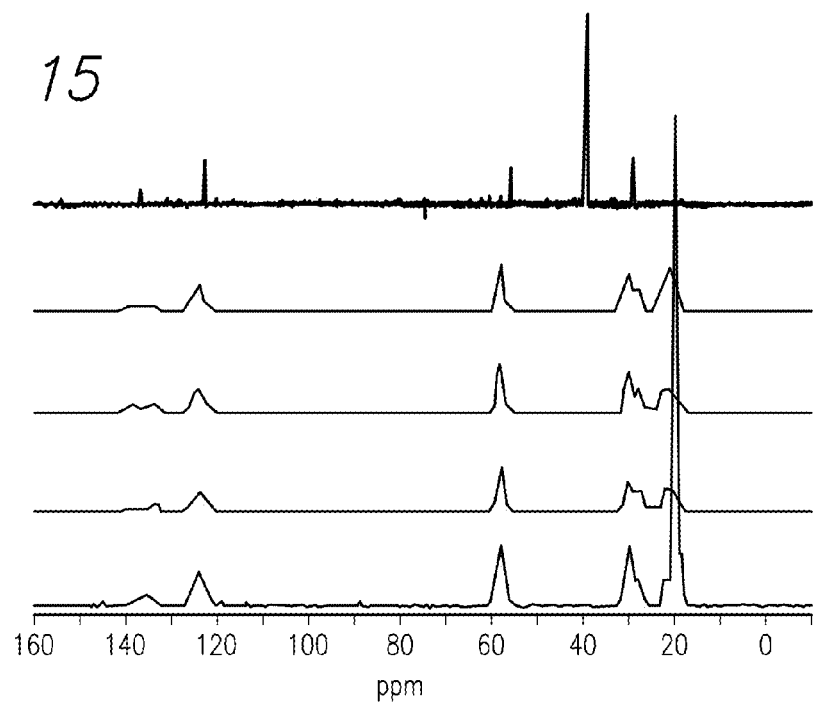
FIG. 15 illustrates $^{13}$CCP-MAS of SSZ-70 solids synthesized according to an embodiment of the present disclosure. Top to bottom=parent SDA in DMSO-$d_6$ (* indicates solvent), B-SSZ-70(OH), B-SSZ-70(F), Al-SSZ-70(F), and Al-SSZ-70(OH).

Calculated carbons to nitrogen molar ratios agree with those expected for the parent SDA. In addition, both imidazolium (135-120 ppm) and alkyl resonances (60-20 ppm) were observed by $^{13}C$ CP-MAS NMR in SSZ-70 solids (FIG. 15). These results confirm that the SDA was intact.

The calculated fluoride to nitrogen molar ratios are shown in Tables 15 and 16, and all F/N ratios can be compared to the theoretical F/N value for the $SDA^+F^-$ salt (0.50 for all imidazolium SDAs studied). This value corresponds to a neutral product with no framework defects to balance the charge of the organic cation. MTW synthesized using 1 gave F/N=0.55 that was very close to the expected value for no framework defects. By comparison, the two Si-SSZ-70 products show significantly lower F/N ratios and this extends to the boron and aluminum containing materials. Fluoride absence implies that the organic charge must be balanced by silanol defects as observed by $^{29}Si$ NMR above (Koller, H.; Lobo, R. F.; Burkett, S. L.; Davis, M. E. *J. Phys. Chem.* 1995, 99(33), 12588-12596).

Chemical analysis of B-SSZ-70(F), Al-SSZ-70(F), and Al-SSZ-70(OH) in Table 16 shows very similar organic content across the seven products. Carbon to nitrogen molar ratios are between 5.6 and 5.8 agreeing well with the expected ratio of 5.5. Slightly higher fluorine content was measured in the borosilicate samples compared to the pure-silica and aluminosilicate samples. With trivalent lattice substitution (B or Al), a framework charge is introduced and fluoride is no longer required to balance the cation charge. However, the calculated F/N ratios show little variation with lattice substitution for both boron and aluminum incorporation, respectively. In addition, the F/N ratios for all three aluminosilicate samples are almost the same as the pure silica products. The report of MCM-22 synthesis using hexamethyleneimine with alkali fluoride salts published previously showed varying amounts of fluoride incorporated in the aluminosilicate product (Aiello, R.; Crea, F.; Testa, F.; Demortier, G.; Lentz, P.; Wiame, M.; Nagy, J. B. *Microporous Mesoporous Mater.* 2000, 35-6, 585-595). Under the approximately neutral reaction conditions the secondary amine should be protonated and similar cation/framework charge arguments must hold.

Inspection of the Si/B and Si/Al ratios measured in the as-made products reveals less boron incorporation than is present in the reaction gel. By comparison, aluminosilicate products synthesized via both fluoride and hydroxide conditions reveal Si/Al ratios almost identical to those in the reaction gel. These data agree with reported trends in boron and aluminum incorporation for products from hydroxide reactions using the same SDA (Zones, S. I.; Hwang, S.-J. *Microporous Mesoporous Mater.* 2003, 58(3), 263-277).

Chemical analysis for both hydroxide mediated products shows some sodium incorporation. The measured Na/Al values correspond to ~0.25 and 0.11 for Si/Al=50 and Si/Al=25, respectively, indicating the framework charge was predominantly compensated by SDA rather than alkali. This suggests organic occupies most of the void space within SSZ-70 in contrast to SSZ-25 where the bulky adamantyl SDA was not expected to fit in the sinusoidal 10MR (Zones, S. I.; Hwang, S. J.; Davis, M. E. *Chem.-Eur. J.* 2001, 7(9), 1990-2001).

Figure 16:
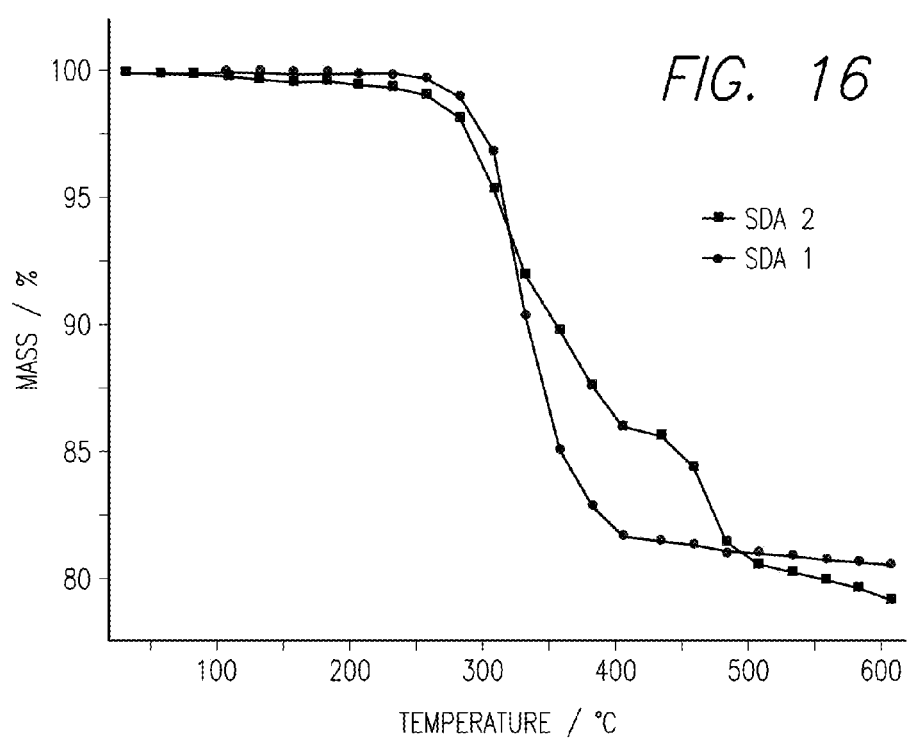
FIG. 16 illustrates TGA of as-synthesized product Si-SSZ-70(F) obtained according to embodiments of the present disclosure.

In addition to chemical analysis, TGA was performed on SSZ-70 products. FIG. 16 compares the TG profiles for Si-SSZ-70(F) synthesized using SDA 1 and SDA 3. Both materials show very similar mass loss between 200 and 620° C. (19.3% for SDA 1 and 20.4% for SDA 3), yet the mass loss profiles are distinct. The smaller bis(isobutyl) SDA 1 shows one mass loss starting at approximately 250° C., whereas two mass loss regions can be seen for the larger bis(cyclohexyl) SDA 3. The first mass loss starts at around 250° C. as per SDA 1 with an inflection point at ~425° C. followed by another mass loss. Observing two mass loss regions with the larger SDA could indicate two distinct organic environments. With as-synthesized SSZ-70 most likely being a layered material, the first mass loss can be assigned to organic occluded between layers and the second mass loss attributed to organic occluded within the layers. Observing one mass loss with the smaller SDA was likely due to a weaker fit within the framework offering lower thermal protection. Several postsynthesis experiments were performed on an Al-SSZ-70 sample synthesized using SDA 3 to gain insight into the relative contribution of each organic environment. The sample was obtained from reaction conditions that use the SAR=35 NaY as an aluminum source, and the product treated with 1 N HCl to neutralize residual FAU species as described in the Experimental Section.

Figure 17:
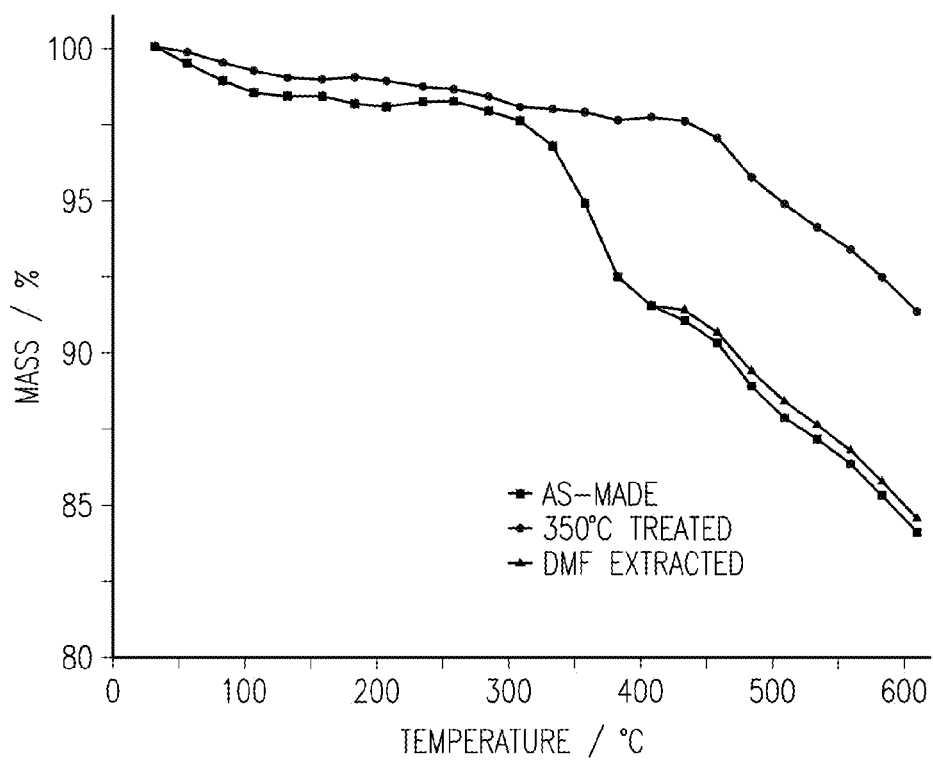
FIG. 17 illustrates TGA of Al-SSZ-70(OH) obtained according to embodiments of the present disclosure, before and after post-synthetic treatments.

The first experiment explored SDA removal by DMF extraction. Similar experiments with SSZ-25 showed organic removal and significant changes in the XRD pattern after DMF extraction (Zones, S. I.; Hwang, S. J.; Davis, M. E. *Chem.-Eur. J.* 2001, 7(9), 1990-2001). No organic removal was detected by TGA after extraction for the Al-SSZ-70 material studied. In addition, the XRD pattern was identical to the parent material. The inability to remove organic by DMF extraction suggests an organic/framework environment similar to traditional zeolites where extraction does not typically remove organic. The second experiment thermally treated the as-made Al-SSZ-70 material to remove the organic species associated with the lower temperature weight loss region (FIG. 17)

Figure 18:
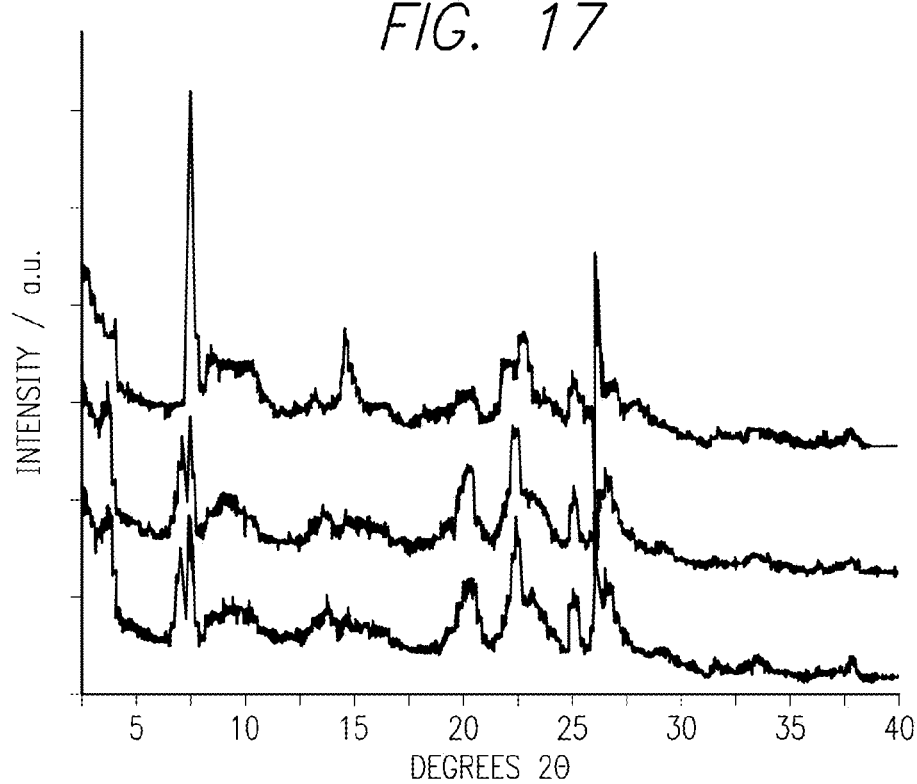
FIG. 18 illustrates XRD patterns of Al-SSZ-70(OH) synthesized according to an embodiment of the present disclosure, before and after postsynthetic treatments. From bottom to top: parent material, DMF extracted, and 350° C. treated.

Inspecting the TGA profiles indicated 350° C. was sufficient to remove organic residing in the first environment, and 350° C. should be approximately 75° C. below the mass loss onset of the second environment. After the sample was heated at 350° C. for 5 h in air, all organic below 425° C. was removed and the XRD pattern showed clear differences. TGA profiles and XRD patterns of the samples after DMF extraction and thermal treatment are shown in Figures 17 and 18, respectively. The XRD pattern resembled calcined Al-SSZ-70(OH) even though ~7 wt % organic remained occluded. This heat treated material was ammonium-exchanged and assessed for micropore volume and catalytic activity as described below.

Micropore volumes of SSZ-70 products were obtained using nitrogen adsorption. All SSZ-70 samples examined were synthesized using SDA 1 except Si-SSZ-70(OH) that used SDA 3 and the Al-SSZ-70(OH) 350° C. treated sample synthesized using SDA 3. Table 17 lists micropore volume for each SSZ-70 material.

TABLE 17

Micropore Volumes of SSZ-70 Products

| SSZ-70 Product | Micropore Volume, $cm^3g^{-1}$ |
|---|---|
| Si-SSZ-70 (F) | 0.20 |
| B-SSZ-70 (F) | 0.20 |
| Al-SSZ-70 (F) | 0.20 |
| Si-SSZ-70 (OH) | 0.09 |
| B-SSZ-70 (OH) | 0.12 |
| Al-SSZ-70 (OH) | 0.14 |
| Al-SSZ-70 (OH), treated at 350° C. | 0.09 |

The data in Table 17 show a clear distinction between the fluoride and hydroxide mediated products with a 0.20 $cm^3g^{-1}$ micropore volume observed from all three fluoride mediated products and 0.09-0.14 $cm^3g^{-1}$ obtained from the hydroxide mediated products. The micropore volumes for the fluoride products are similar to those reported for MWW materials (0.17-0.18 $cm^3g^{-1}$) (Camblor, M. A.; Corell, C.; Corma, A.; Diaz-Cabanas, M.-J.; Nicolopoulos, S.; Gonzalez-Calbet, J. M.; Vallet-Regi, M. *Chem. Mater.* 1996, 8(10), 2415-2417). The 350° C. treated material shows approximately two-thirds the micropore volume of calcined Al-SSZ-70(OH) material. Assuming this organic resides in interlayer regions, this gives a similar contribution as reported for SSZ-25 where ~0.12 $cm^3g^{-1}$ micropore volume was attributed to the large cages formed between layers.

Figure 19:
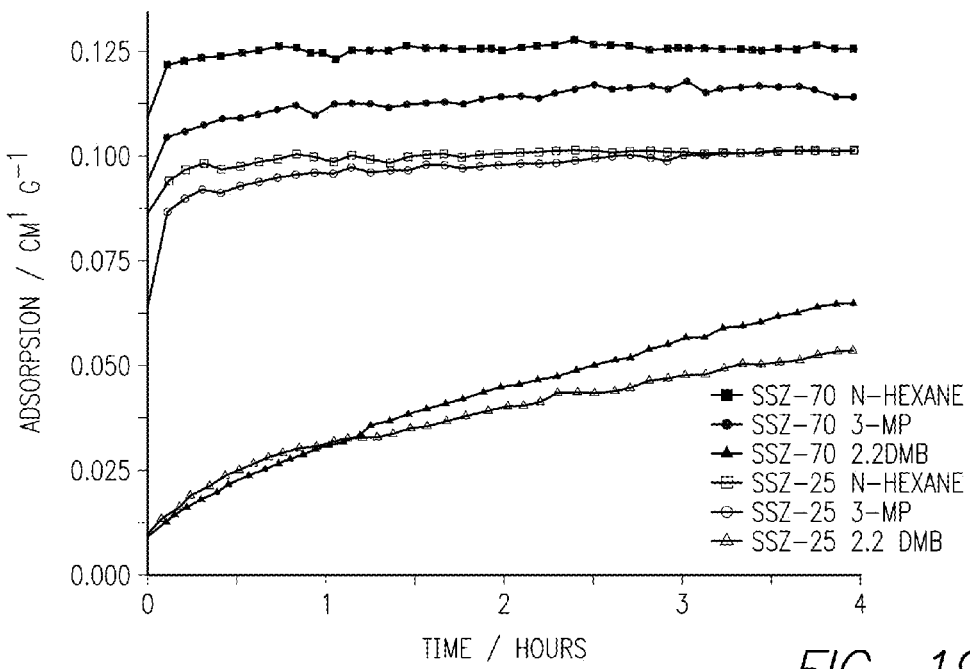
FIG. 19 illustrates hydrocarbon adsorption vs. time for SSZ-70 and SSZ-25 materials obtained according to embodiments of the present disclosure. 3-MP is 3-methylpentane, and 2,2-DMB is 2,2-dimethylbutane.

Hydrocarbon adsorption was performed to gain insight into possible pore sizes. FIG. 19 shows the time dependence of the adsorption capacity of n-hexane, 3-methylpentane, and 2,2-dimethylbutane in SSZ-70 and SSZ-25. The kinetic diameters of these three molecules are 4.4 Angstrom for n-hexane, 5.0 Angstrom for 3-methylpentane, and 6.2 Angstrom for 2,2-dimethylbutane. The fast uptakes of n-hexane and 3-methylpentane (both are the reactants for the constraint index test to be discussed below) in both SSZ-70 and SSZ-25 indicate that the diffusion of the molecules of these two adsorbates is not hindered in channel systems of these two zeolites. These results also imply that the catalytic cracking reactions of n-hexane and 3-methylpentane occurring in the constraint index test of SSZ-70 and SSZ-25 are not controlled by the reactant shape selectivity. The slow uptakes of 2,2-dimethylbutane observed in both SSZ-70 and SSZ-25 indicate that the effective size of the pore openings of SSZ-70 and SSZ-25 become especially critical to the diffusivity of bulkier 2,2-dimethylbutane molecules, as previously reported for 10-ring zeolites (Chen, C. Y.; Zones, S. I. *Microporous Mesoporous Mater.* 2007, 104 (1-3), 39-45. Zones, S. I.; Chen, C. Y.; Corma, A.; Cheng, M. T.; Kibby, C. L.; Chan, I. Y.; Burton, A. W. *J. Catal.* 2007, 250(1), 41-54). Therefore, these results suggest that SSZ-70 is a medium pore zeolite.

Catalytic Activity.

Figure 20:
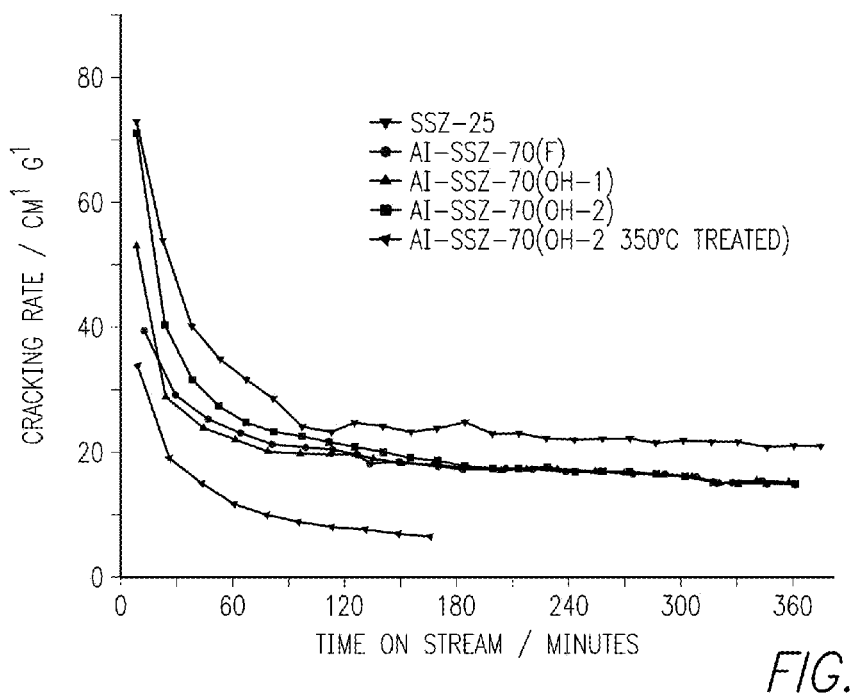
FIG. 20 illustrates CI test cracking rate vs. time on stream for Al-SSZ-70 materials obtained according to embodiments of the present disclosure.

The constraint index test was used as a model acid-catalyzed hydrocarbon reaction. Four Al-SSZ-70 materials were tested: Al-SSZ-70(F, Si/Al=26) and Al-SSZ-70(OH, Si/Al=22) synthesized using SDA 1 plus Al-SSZ-70(OH) and the 350° C. treated material synthesized using SDA 2. The physicochemical characterizations outlined above for SSZ-70 showed similarity to MWW materials, so SSZ-25 was included for comparison (the SSZ-25 CI test reaction was performed at 330° C.). FIG. 20 shows the cracking rate as a function of time on stream (TOS). Results from a more comprehensive study on the CI test behavior reported high initial activity for SSZ-25 that was comparable to BEA* and greater than MFI, which was followed by rapid deactivation (Carpenter, J. R.; Yeh, S.; Zones, S. I.; Davis, M. E. J. Catal. In press).

Figure 21:
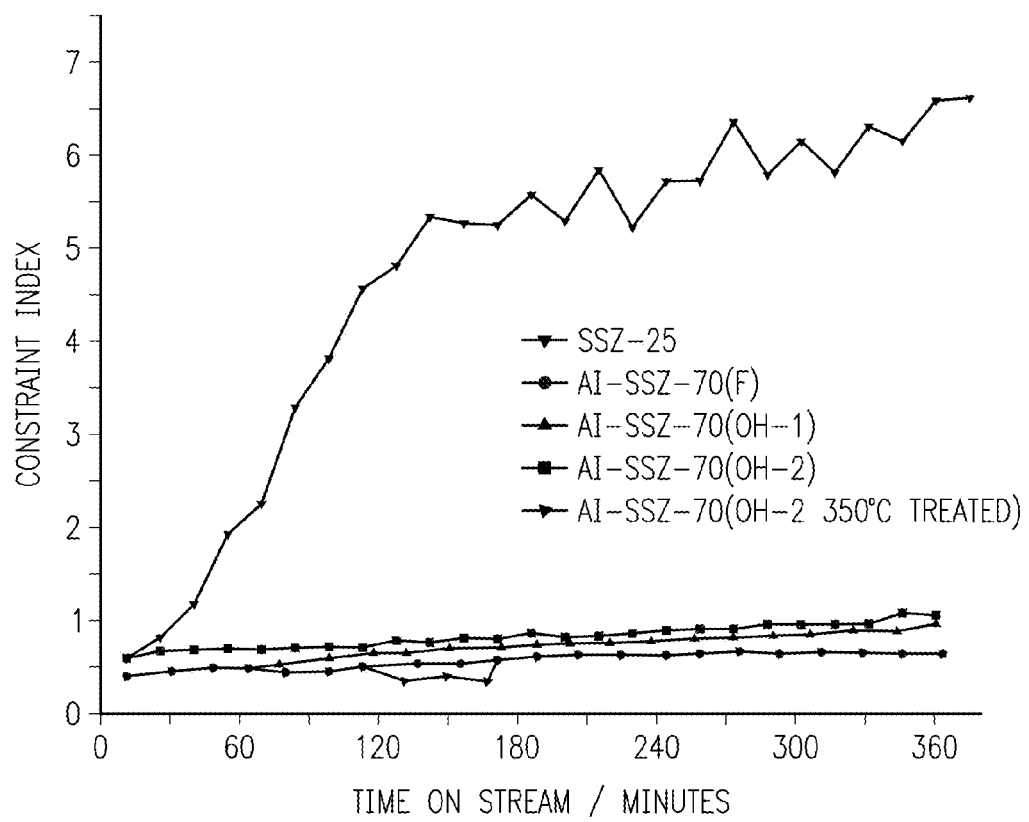
FIG. 21 illustrates constraint index vs. time on stream for Al-SSZ-70 materials obtained according to embodiments of the present disclosure. Al-SSZ-70(OH-1)=Al-SSZ-70(OH) synthesized using SDA 1 and Al-SSZ-70(OH-2)=Al-SSZ-70(OH) synthesized using SDA 2.

The three SSZ-70 materials shown here behave similarly. The deactivation with TOS follows a similar path as SSZ-25. The 350° C. treated material shows the same deactivation trend although the initial rate was significantly lower than for all other materials owing to a lower number of active sites. These data suggest a similarity to MWW materials; however, the CI value versus TOS relationships shown in FIG. 21 present a clear distinction between SSZ-70 and SSZ-25. All materials reveal initial CI values <1 with SSZ-25 giving a rapid increase as previously described (Zones, S. I.; Harris, T. V. Microporous Mesoporous Mater. 2000, 35-6, 31-46). By contrast, all SSZ-70 materials maintain CI values <1.2 throughout the reaction. With regards to the TOS behavior of SSZ-25, it was postulated the deactivation rates of the two independent pore systems were different giving rise to a changing CI value. Both pore systems could contribute to the initial reactivity, with the more accessible MWW cage dominating over the sinusoidal pore system. The high initial activity from active sites located within the cages can mask the sinusoidal pore reactivity. As active sites in the cages deactivated due to fouling, the sinusoidal pores can account for relatively higher reactivity resulting in an increase in the CI value to the range expected for medium pore materials (1<CI<12). MWW deactivation in n-heptane cracking at 350° C. showed carbonaceous deposits only formed in supercages with no deactivation observed in the sinusoidal channels (Matias, P.; Lopes, J. M.; Laforge, S.; Magnoux, P.; Guisnet, M.; Ribeiro, F. R. Appl. Catal., A 2008, 351(2), 174-183). All SSZ-70 materials reveal similar cracking rate deactivation suggesting the presence of a similar cavity, but the absence of an increasing CI value as the material deactivates suggests a second pore system distinct to the sinusoidal 10MR pore found in MWW.

In summary in several embodiments, a method for preparing molecular sieves is provided, the method including preparing a reaction mixture, comprising a structure directing agent, at least one source of at least one oxide of a tetravalent element, optionally, one or more sources of one or more oxides selected from the group consisting of oxides of trivalent elements, pentavalent elements, and mixtures thereof, optionally, at least one source of an element selected from Groups 1 and 2 of the Periodic Table; and optionally, hydroxide ions or fluoride ions, and maintaining the reaction mixture under conditions sufficient to form crystals of the molecular sieve. In the method, various imidazolium cations are used as the structure directing element.

The examples set forth above are provided to give those of ordinary skill in the art a complete disclosure and description of how to make and use the embodiments of the molecular sieves, structure agents, methods and systems of the disclosure, and are not intended to limit the scope of what the inventors regard as their disclosure. Modifications of the above-described modes for carrying out the disclosure that are obvious to persons of skill in the art are intended to be within the scope of the following claims.

All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. to the same extent as if each reference had been incorporated by reference in its entirety individually.

It is to be understood that the disclosures are not limited to particular compositions or chemical systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Additionally, unless otherwise specified, the recitation of a genus of elements, materials or other components, from which an individual component or mixture of components can be selected, is intended to include all possible sub-generic combinations of the listed components and mixtures thereof. Also, "comprise," "include" and their variants, are intended to be non-limiting, such that recitation of items in a list is not to the exclusion of other like items that can also be useful in the materials, compositions and methods of this disclosure.

Although any methods and materials similar or equivalent to those described herein can be used in the practice for testing of the products, methods and system of the present disclosure, exemplary appropriate materials and methods are described herein as examples and for guidance purpose.

A number of embodiments of the disclosure have been described. Nevertheless, it will be understood that various modifications can be made without departing from the spirit and scope of the present disclosure. Accordingly, other embodiments are within the scope of the following claims.

The invention claimed is:

1. A method for preparing an as-synthesized molecular sieve SSZ-70, the method comprising:
  preparing a reaction mixture comprising:
    a structure directing agent comprising an imidazolium cation of formula 1, 2, 3, 4, 5, or 12:

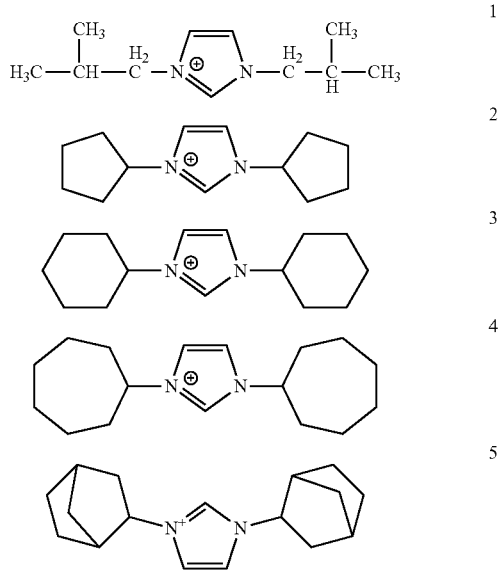

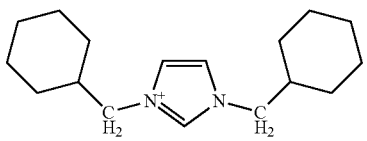

at least one source of at least one oxide of a tetravalent element;

optionally, one or more sources of one or more oxides selected from the group consisting of oxides of trivalent elements, pentavalent elements, and mixtures thereof;

optionally, at least one source of an element selected from Groups 1 and 2 of the Periodic Table; and optionally, hydroxide ions or fluoride ions; and maintaining the reaction mixture for a time and under conditions suitable to form crystals of the molecular sieve SSZ-70, to thereby obtain the as-synthesized molecular sieve SSZ-70.

2. The method of claim 1, wherein an imidazolium cation is associated with an anion selected from the group consisting of hydroxide, fluoride, chloride, bromide, iodide, acetate, sulfate, tetrafluoroborate and carboxylate.

3. The method of claim 1, wherein the tetravalent element is selected from the group consisting of silicon, germanium and titanium.

4. The method of claim 1, wherein the tetravalent element is silicon.

5. The method of claim 1, wherein the source of the tetravalent element is selected from the group consisting of oxides, hydroxides, acetates, oxalates, ammonium salts and sulfates of the tetravalent element.

6. The method of claim 1, wherein the source of an element selected from Groups 1 and 2 of the Periodic Table is selected from the group consisting of an alkali metal hydroxide and an alkaline earth metal hydroxide.

7. The method of claim 6, wherein the alkali metal hydroxide is selected from the group consisting of sodium hydroxide, potassium hydroxide, lithium hydroxide, cesium hydroxide and rubidium hydroxide.

8. The method of claim 6, wherein the alkaline earth metal hydroxide is selected from the group consisting of calcium hydroxide and magnesium hydroxide.

9. The method of claim 1, wherein the trivalent element is selected from the group consisting of boron, aluminum, gallium and iron.

10. The method of claim 1, wherein the trivalent element is boron.

11. The method of claim 1, wherein the reaction mixture comprises hydroxide ions, $SiO_2$ and $B_2O_3$, and wherein the mole ratio between $SiO_2$ and $B_2O_3$ is about 20-200 to 1.

12. The method of claim 1, wherein the reaction mixture comprises hydroxide ions, $SiO_2$ and $Al_2O_3$, and wherein the mole ratio between $SiO_2$ and $Al_2O_3$ is about 30-45 to 1.

13. The method of claim 1, wherein the reaction mixture comprises hydroxide ions or fluoride ions, $SiO_2$ and $GeO_2$, and wherein the mole ratio between $SiO_2$ and $GeO_2$ is about 2-50 to 1.

14. The method of claim 1, wherein the reaction mixture comprises fluoride ions $SiO_2$ and $Al_2O_3$, and wherein the mole ratio between $SiO_2$ and $Al_2O_3$ is about 30-500 to 1.

15. The method of claim 1, wherein the conditions suitable to form crystals of the molecular sieve comprise maintaining the reaction mixture at a temperature between about 125° C. and about 200° C. until the molecular sieve is formed.

16. The method of claim 15, further including maintaining the reaction mixture under pressure in the range between about 0.34 MPa and about 1.38 MPA.

17. The method of claim 1, further including calcinating the as-synthesized molecular sieve by thermal treatment in an oxidative atmosphere.

18. The method of claim 17, wherein the process of calcination is conducted in an atmosphere selected from the group consisting of steam, air and an inert gas at a temperature between about 200° C. and about 800° C. for a period of time that is at least 1 hour.

19. The method of claim 1, wherein the reaction mixture comprises hydroxide ions, $SiO_2$ and $B_2O_3$, and wherein the mole ratio between $SiO_2$ and $B_2O_3$ is about 200 to 1.

20. The method of claim 1, wherein the reaction mixture comprises hydroxide ions, $SiO_2$ and $Al_2O_3$, and wherein the mole ratio between $SiO_2$ and $Al_2O_3$ is about 45 to 1.

21. An as-synthesized molecular sieve SSZ-70 comprising $TO_2$, $X_2O_a$, a metal, a fluoride and a structure directing agent, wherein the mole ratio between $TO_2$ and $X_2O_a$ is at least about 2;

the mole ratio between the metal and $TO_2$ is between about 0 and about 0.03;

the mole ratio between the structure directing agent and $TO_2$ is between about 0.02 and about 0.06, and the mole ratio between the fluoride and $TO_2$ is between about 0 and about 0.08;

and wherein:

T is selected from the elements from Groups 4-14 of the Periodic Table or a combination thereof;

X is selected from the elements from Groups 3-13 of the Periodic Table, or a combination thereof;

a=3 when X is trivalent; a=5 when X is pentavalent;

the metal is selected from the group consisting of alkali metals and alkaline earth metals, or a combination thereof; and the structure directing agent is an imidazolium cation selected from the group consisting of:

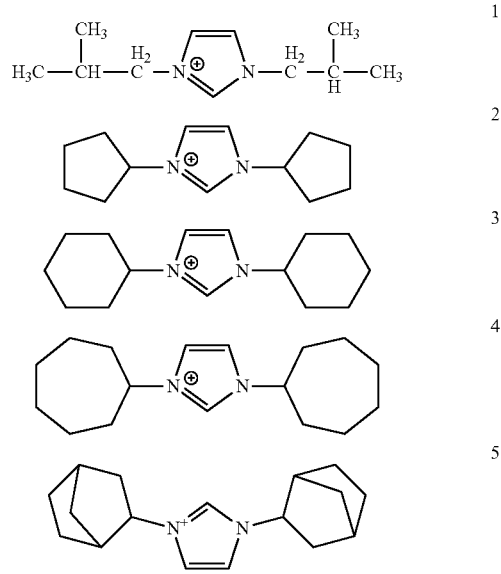

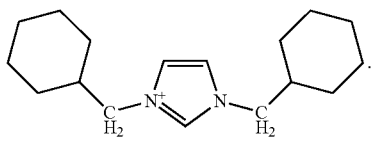
12
22. The molecular sieve of claim 21, wherein T is selected from the group consisting of silicon, germanium and titanium.
23. The molecular sieve of claim 21, wherein X is selected from the group consisting of gallium, aluminum, iron and boron.
* * * * *